United States Patent
Morishima et al.

[11] Patent Number: 5,589,956
[45] Date of Patent: Dec. 31, 1996

[54] IMAGE DISPLAY APPARATUS

[75] Inventors: Hideki Morishima, Tokyo; Susumu Matsumura, Kawaguchi; Naosato Taniguchi; Yoko Yoshinaga, both of Machida; Shin Kobayashi, Atsugi; Toshiyuki Sudo, Kawasaki; Tadashi Kaneko, Isehara, all of Japan

[73] Assignee: Canon Kabushiki Kaisha, Tokyo, Japan

[21] Appl. No.: 626,901

[22] Filed: Apr. 4, 1996

Related U.S. Application Data

[63] Continuation of Ser. No. 102,995, Jul. 28, 1993, abandoned.

[30] Foreign Application Priority Data

Jul. 31, 1992 [JP] Japan .................. 4-224869

[51] Int. Cl.⁶ .................................................. G02B 5/32
[52] U.S. Cl. .................. 359/15; 359/1; 359/13; 345/7; 345/9
[58] Field of Search ........................ 359/1, 13, 14, 359/15, 16, 22, 24, 32, 33, 25, 23; 345/4, 7–9, 32, 55, 58; 348/40

[56] References Cited

U.S. PATENT DOCUMENTS

| | | | |
|---|---|---|---|
| 3,737,212 | 6/1973 | Antonson et al. | 359/16 |
| 4,547,037 | 10/1985 | Case | 359/22 |
| 4,688,879 | 8/1987 | Fairchild | 340/908 |
| 4,818,048 | 4/1989 | Moss | 345/7 |
| 4,889,780 | 12/1989 | Cosner | 359/13 |
| 5,035,473 | 7/1991 | Kuwayama et al. | 359/13 |
| 5,089,903 | 2/1992 | Kuwayama et al. | 359/15 |
| 5,128,780 | 7/1992 | Smith | 359/24 |
| 5,162,928 | 11/1992 | Taniguchi et al. | 359/13 |
| 5,186,533 | 2/1993 | Hori | 359/13 |
| 5,210,626 | 5/1993 | Kumayama et al. | 359/13 |
| 5,224,198 | 6/1993 | Jachimowicz et al. | 359/13 |
| 5,257,094 | 10/1993 | LaRussa | 359/22 |
| 5,379,133 | 1/1995 | Kirk | 359/15 |

FOREIGN PATENT DOCUMENTS

| | | |
|---|---|---|
| 0216692 | 4/1987 | European Pat. Off. |
| 3908300 | 9/1989 | Germany |
| 3203478 | 9/1991 | Japan |
| 434512 | 2/1992 | Japan |
| 2206421 | 1/1989 | United Kingdom |
| 2211646 | 7/1989 | United Kingdom |

*Primary Examiner*—Thong Nguyen
*Assistant Examiner*—Darren E. Schuberg
*Attorney, Agent, or Firm*—Fitzpatrick, Cella, Harper & Scinto

[57] ABSTRACT

An image display apparatus includes a plurality of image display elements respectively assigned to different partial image information regions of an image to be displayed, and a hologram optical element for diffracting a plurality of light beams from the plurality of image display elements and displaying the diffracted light beams as continuous single image information. By including a plurality of image display elements, each of the image display elements having a large number of pixels, and a hologram optical element for forming a synthesized image by diffracting a plurality of image light beams from the image display elements, the hologram optical element diffracts the plurality of image light beams so as to display a synthesized image by interpolating information between pixels of a plurality of images to be synthesized.

15 Claims, 24 Drawing Sheets

FIG. 19
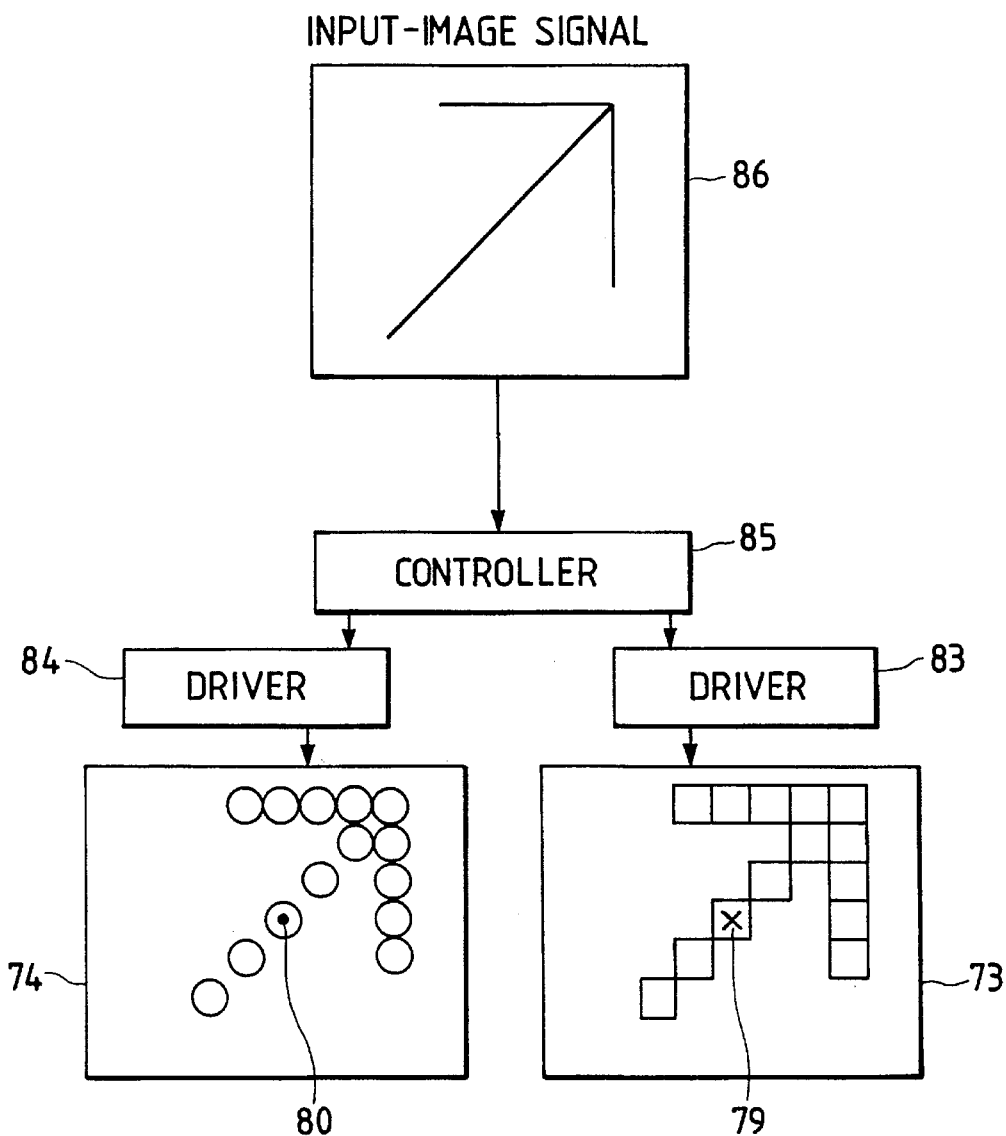
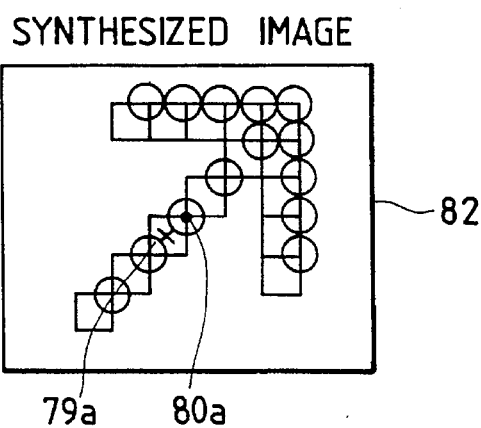

FIG. 27A
FIG. 27B
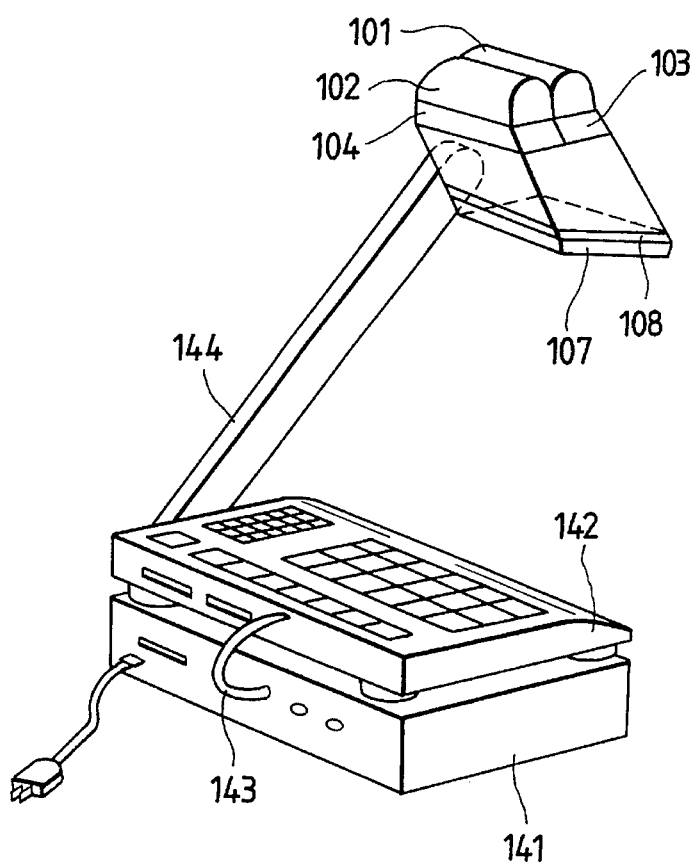
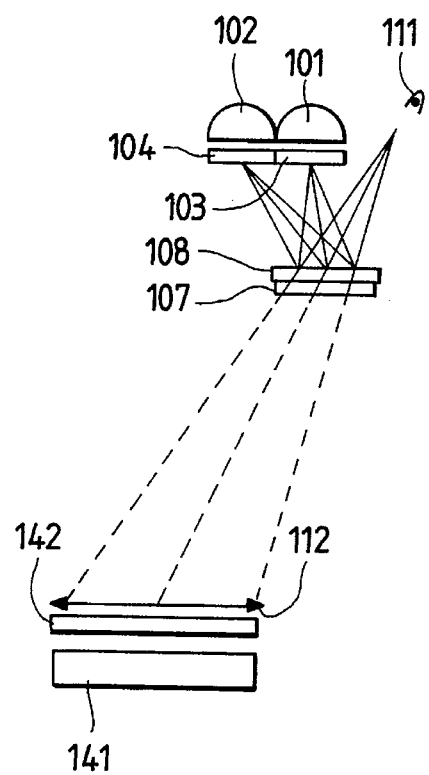

IMAGE DISPLAY APPARATUS

This application is a continuation of application Ser. No. 08/102,995, filed Jul. 28, 1993, now abandoned.

BACKGROUND OF THE INVENTION

1. Field of the Invention

The present invention relates to an image display apparatus and, more particularly, to an image display apparatus which can display image information displayed on an image display element with a large field of view with high definition by utilizing a hologram optical element while making the entire apparatus compact.

2. Related Background Art

Conventionally, as an image display apparatus which allows a user to observe realistic image with a large field of view information displayed on an image display element such as a liquid crystal element as an image on a large screen, a large-scale CRT display apparatus, a projection TV apparatus, and the like are used.

These image display apparatuses suffer from the following problems. That is, such an image display apparatus requires a large space, and the surrounding area must be kept dark to satisfactorily observe image information.

In order to solve these problems, for example, as shown in FIG. 1, there is proposed an image display apparatus wherein a light beam from an image display apparatus is directly guided to eyes (the pupils of an observer) using an optical system arranged near the face of the observer.

Referring to FIG. 1, a liquid crystal display (liquid crystal panel) 201 displays image information on the basis of image data sent via a signal line 206. A backlight light source 204 illuminates the liquid crystal display 201. A light beam 208 based on image information displayed on the liquid crystal display 201 is reflected by a mirror 205 via an enlarging lens unit 203 consisting of concave and convex lenses, and is incident on the eyes (observation pupils) of an observer 210 as a reflected light beam 209.

At this time, the enlarging lens unit 203 displays, as a virtual image, image information displayed on the liquid crystal display 201 on a virtual image plane 202 a predetermined distance (e.g., 5 m) ahead of pupils 207 of the observer via the mirror 205. Thus, the observer recognizes, on the virtual image plane, image information displayed on the liquid crystal display 201. The term "observe" is hereinafter defined as "observe with recognition".

There is also proposed an image display apparatus, which allows an observer to personally observe image information such as a television image in an enlarged scale using an optical device 225 attached to his or her head, as shown in FIG. 2. Note that FIG. 2 is a perspective view of main part of the apparatus when viewed from the obliquely lower direction.

The main part of the image display apparatus shown in FIG. 2 will be described below. The apparatus includes liquid crystal color televisions 221R and 221L for the right and left eyes. Some light components of image information displayed on each of the liquid crystal color televisions 221R and 221L are reflected by a trapezoidal beam splitter 222R (and 222L, not shown) arranged in front of each eye, and are incident on a front concave mirror 223. The light beam reflected by the concave mirror 223 is transmitted through the beam splitter 222R (222L), and is incident on the corresponding eye of an observer (not shown). Thus, the observer recognizes image information displayed on the liquid crystal color televisions 221R and 221L as a virtual image at a predetermined position in front of the concave mirror 223.

At this time, in order to compensate for shortage of the number of pixels of the liquid crystal display panels and not to show a joint between pixels, pixel positions of the liquid crystal color televisions 221R and 221L are determined, so that their pixels are shifted from each other, and pixels are sampling-displayed to be further shifted from the pixel positions.

The image display apparatus shown in FIG. 1 has a small image display element, and the number of pixels thereof is limited. For this reason, when an image is to be displayed with a large field of view in an enlarged scale, an observer undesirably recognizes pixels, and it is difficult for the observer to observe high-quality image information.

For example, when a compact liquid crystal display is used as an image display element, most of existing liquid crystal displays have about 300,000 pixels. For this reason, the liquid crystal display has a resolution as low as that of an NTSC signal output from a video tape recorder, and it is very difficult to display such image information with a large field of view or with high definition.

In the image display apparatus shown in FIG. 2, two pieces of image information shifted from each other by about 0.5 pitches are respectively observed by the right and left eyes.

But, in general, when two pieces of image information are respectively input to the right and left eyes of a man, he or she searches and determines the corresponding origins of the two pieces of image information from his or her eyes, and thereafter, performs edge detection of each image information, differential processing for detecting a binocular parallax, and the like, thus recognizing the image information.

In view of such an image recognition mechanism of humans, it is very difficult to interpolate information between pixels by observing two pieces of pixel-shifted image information by the two eyes, and to recognize a single high-definition image.

In most of the methods of observing two pieces of pixel-shifted image information by right and left eyes, the corresponding origins of the two pieces of image information are merely determined to be shifted from each other, and it is difficult to recognize such image information as different pixel-shifted image information.

SUMMARY OF THE INVENTION

The present invention has been made in consideration of the above-mentioned problems, and has as its object to provide an image display apparatus capable of displaying a high-definition image.

An image display apparatus according to the present invention displays light beams from a plurality of image display elements as continuous single image information via a hologram optical element.

An image display apparatus according to the present invention comprises a plurality of image display elements respectively assigned to image information of different partial regions of a display image, and a hologram element for diffracting a plurality of light beams from the plurality of image display elements, and displaying the diffracted light beams as continuous single image information.

An image display apparatus according to the present invention comprises a plurality of image display elements each having a large number of pixels, and a hologram optical element for diffracting a plurality of image light beams from the image display elements, and forming a synthesized image, and the hologram optical elements diffracts the plurality of image light beams so as to display a synthesized image obtained by interpolating information between pixels of a plurality of images to be synthesized.

BRIEF DESCRIPTION OF THE DRAWINGS

FIG. 19 is a partial explanatory view of FIG. 17;

FIGS. 27A and 27B are respectively a schematic perspective view and a schematic side view of the ninth embodiment of the present invention.

DESCRIPTION OF THE PREFERRED EMBODIMENTS

Figure 1:
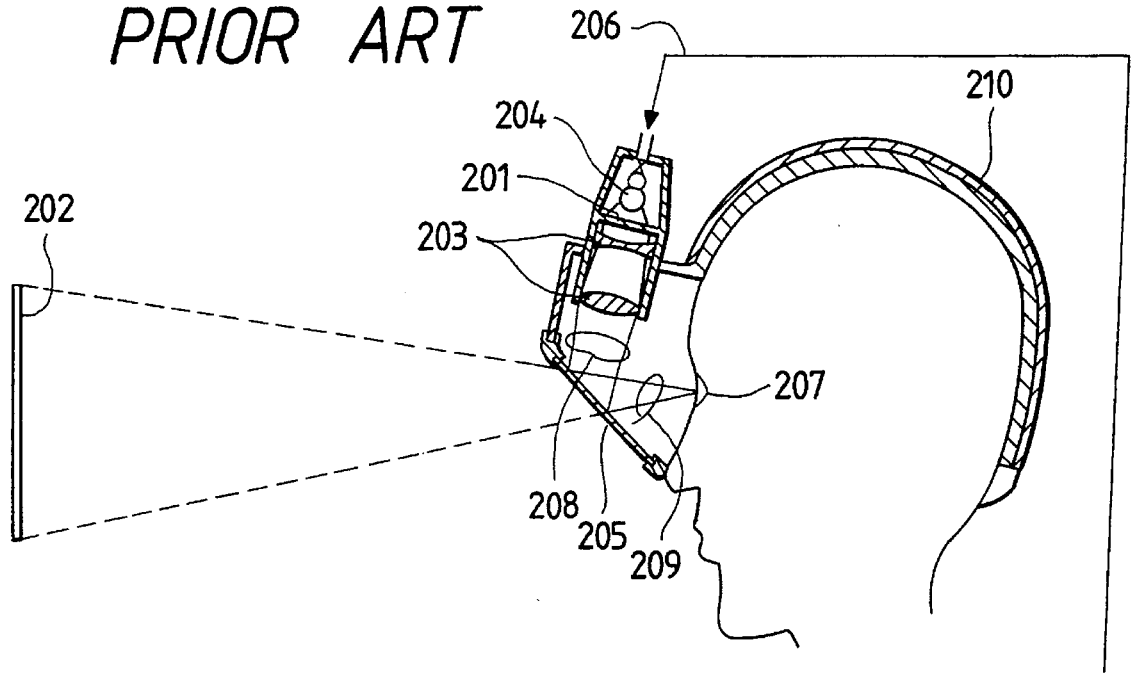
FIG. 1 is a schematic sectional view showing the main part of a conventional image display apparatus.
Figure 2:
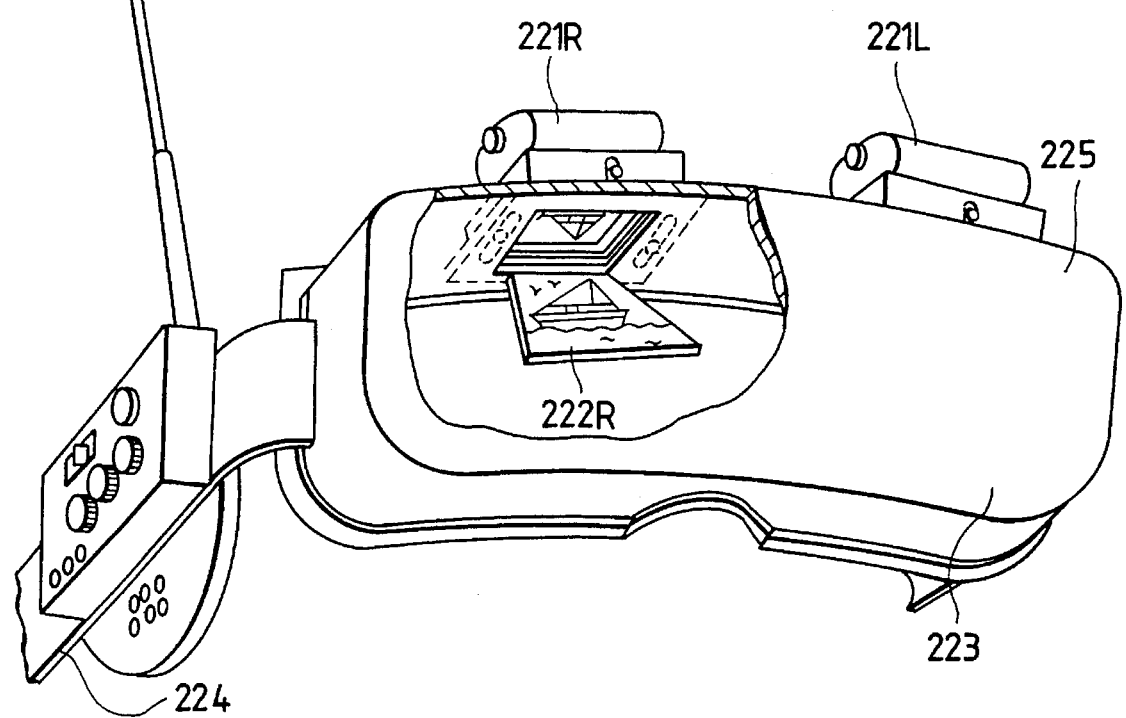
FIG. 2 is a schematic perspective view showing the main part of another conventional image display apparatus.
Figure 3:
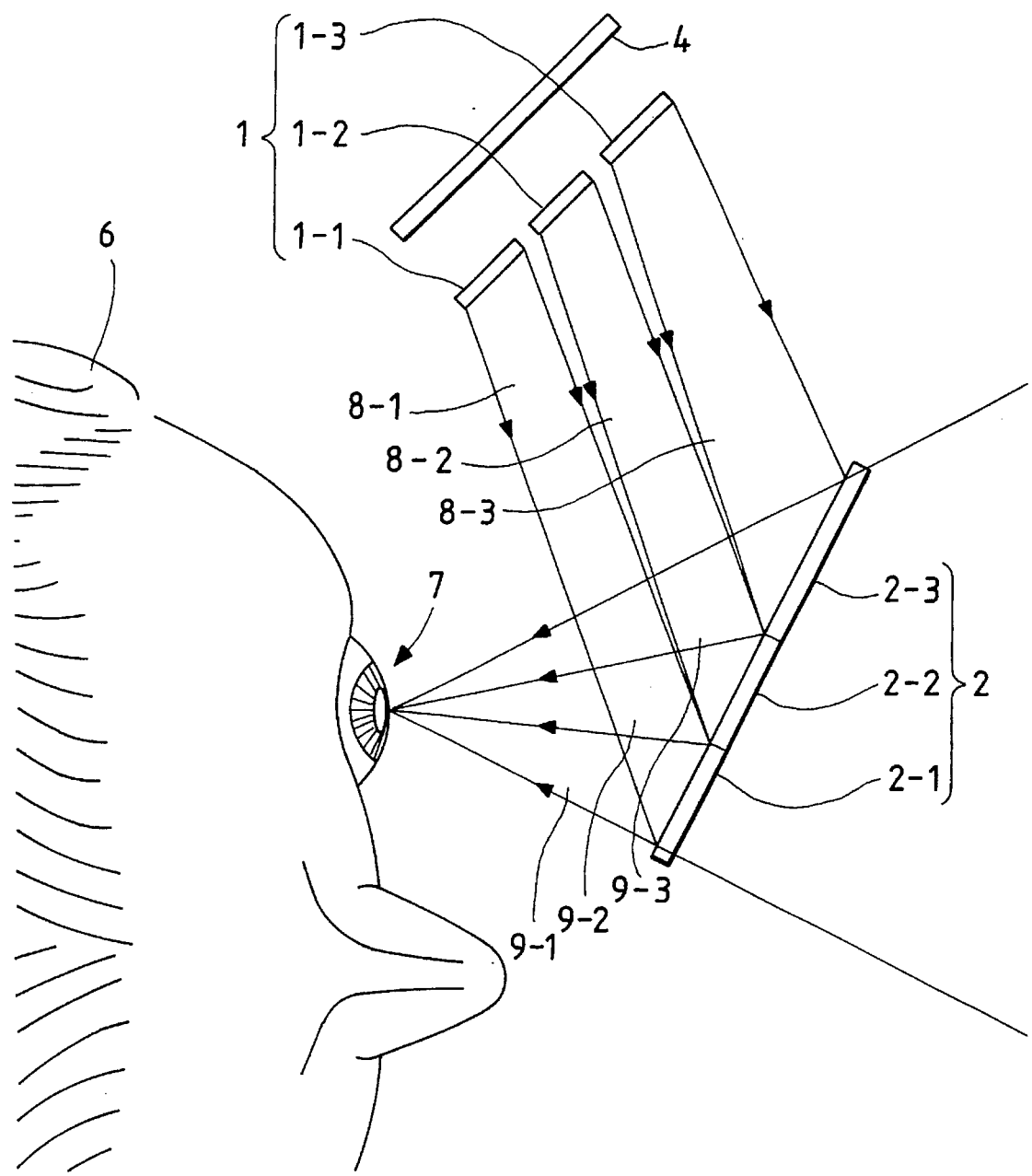
FIG. 3 is a schematic partial plan view showing the first embodiment of the present invention.

FIG. 3 is a partial schematic plan view showing the main part of an image display apparatus according to the first embodiment of the present invention.

FIG. 3 illustrates a state wherein only the left eye portion of an observer 6 is observed from a position above the head of the observer 6, and does not illustrate the right eye portion. However, the apparatus is symmetrical about the center of the face of the observer 6. Note that members for supporting respective elements are not shown in FIG. 3 for the sake of simplicity.

Referring to FIG. 3, liquid crystal displays (to be abbreviated as "LCDs" hereinafter) 1 (1-1, 1-2, and 1-3) as image display elements are arranged on a single plane. These LCDs receive different image signals sent via signal lines (not shown) connected thereto, and display different image information.

A backlight light source 4 illuminates the LCDs (1-1, 1-2, and 1-3), and light beams 8-1, 8-2, and 8-3 respectively emerge from the LCDs (1-1, 1-2, and 1-3).

A reflection type hologram optical element (to be abbreviated as an "HOE" hereinafter) 2 is constituted by connecting three different reflection type elementary hologram optical elements (to be referred to as "elementary HOEs" hereinafter) 2-1, 2-2, and 2-3 without any gap (although the reflection type elementary HOEs are used in this embodiment, basically the same arrangement can be used even when transmission type elementary HOEs are used). Of these elementary HOEs, the elementary HOE 2-1 reflects the light beam 8-1 based on image information displayed on the LCD 1-1, and guides the light beam to a pupil 7 of the left eye of the observer 6 as a reflected light beam 9-1.

Similarly, the elementary HOE 2-2 (2-3) reflects the light beam 8-2 (8-3) based on image information displayed on the LCD 1-2 (1-3), and guides the light beam to the pupil 7 of the left eye of the observer 6 as a reflected light beam 9-2 (9-3). At this time, the observer 6 recognizes three pieces of image information displayed on the three LCDs (1-1, 1-2, and 1-3) at a predetermined position in front of the HOE 2 as continuous single image information connected without gaps with a large field of view.

The respective elements of the image display apparatus of this embodiment will be described below.

Figure 4:
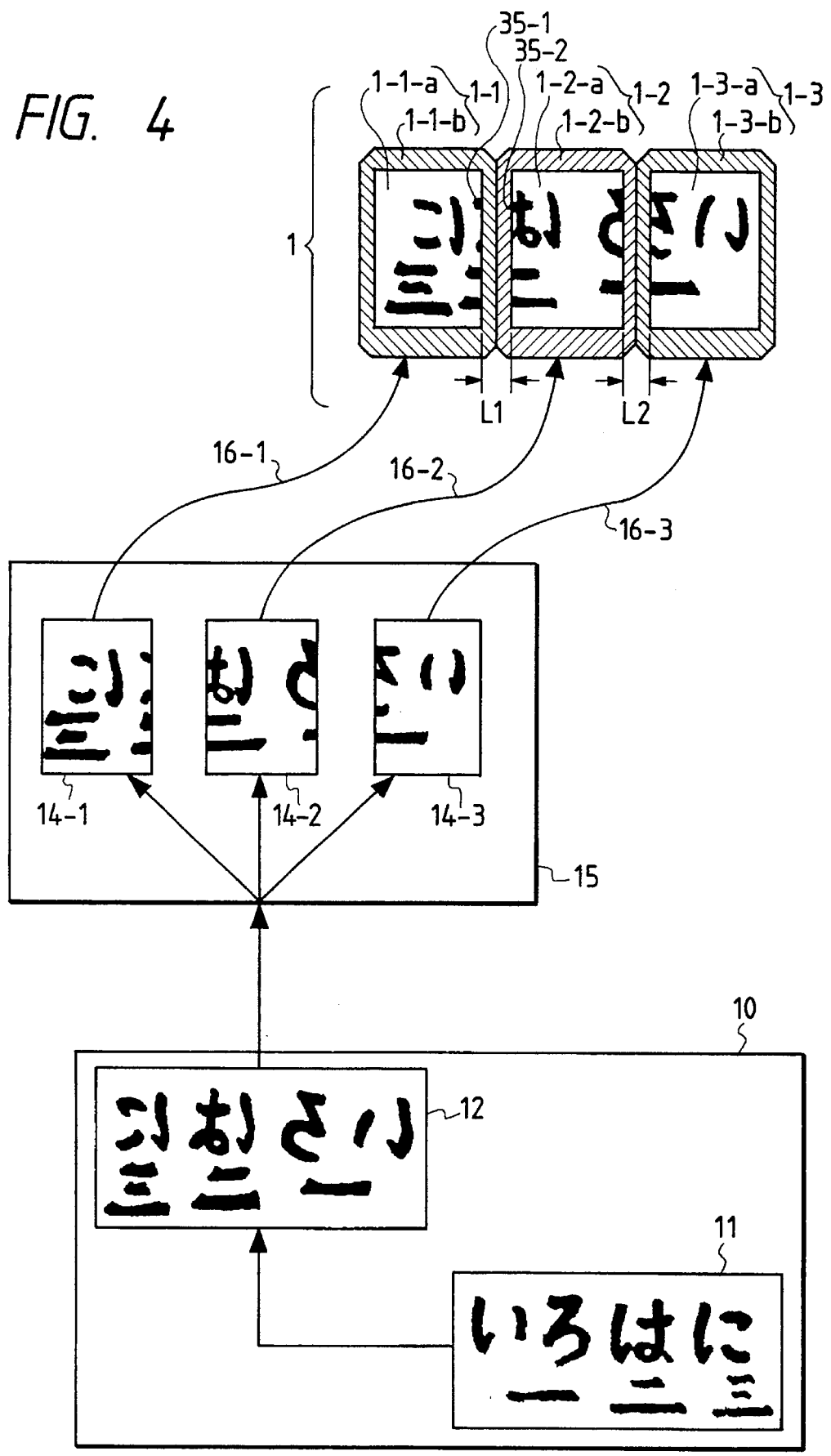
FIG. 4 is an explanatory view of an image display element shown in FIG. 3.

FIG. 4 is an explanatory view of the image display element for displaying image information with a large field of view in this embodiment.

FIG. 4 shows processing steps of dividing a large single image 11 into three images, and divisionally displaying the three images on the three LCDs 1-1, 1-2, and 1-3 (the number of divided images is not limited to 3). The image 11 is generated by a computer 10, and is converted into a mirror image 12. Thereafter, the mirror image 12 is supplied to an image dividing circuit 15. The image dividing circuit 15 divides the mirror image 12 into partial images 14 (14-1, 14-2, and 14-3) to be displayed on the LCDs (1-1, 1-2, and 1-3). Of these partial images, the circuit 15 supplies the partial image 14-1 to the LCD 1-1 via a signal line 16-1, the partial image 14-2 to the LCD 1-2 via a signal line 16-2, and the partial image 14-3 to the LCD 1-3 via a signal line 16-3.

Note that the LCD 1 is illustrated as a plan view when the LCD 1 is viewed from the reflection type HOE 2 in FIG. 3.

LCD frames 1-1-b, 1-2-b, and 1-3-b protect and fix the LCDs 1-1, 1-2, and 1-3, respectively, and are assembled with electronic circuits. Image information is displayed on regions 1-1-a, 1-2-a, and 1-3-a of the LCDs 1.

It is difficult to arrange the three LCDs (1-1, 1-2, and 1-3) without gaps, and to display three pieces of image information on the LCDs without gaps due to the presence of the LCD frames 1-1-b, 1-2-b, and 1-3-b. In FIG. 4, the gap between the LCDs 1-1 and 1-2 is represented by L1, and the gap between the LCDs 1-2 and 1-3 is represented by L2.

Figure 5:
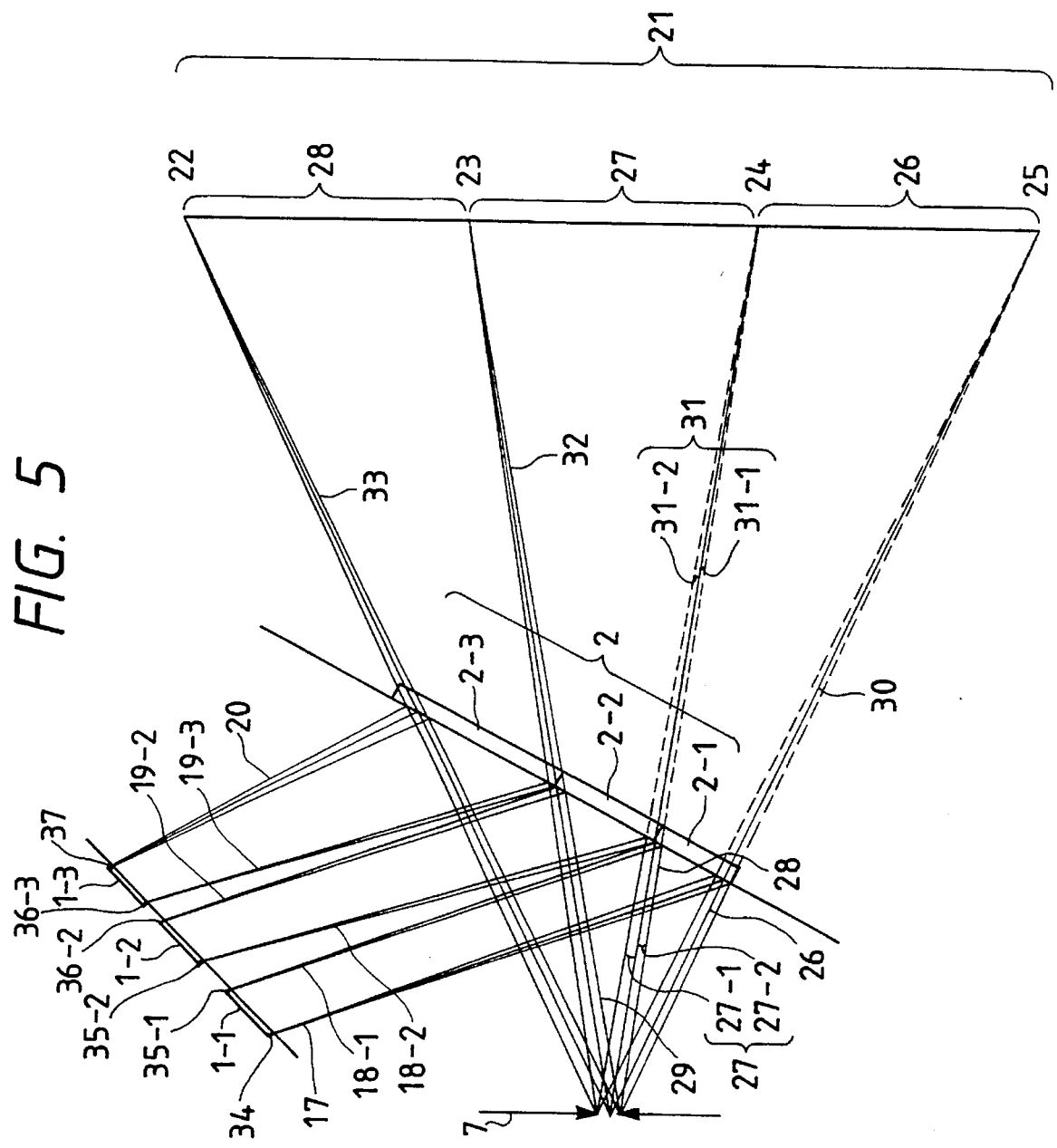
FIG. 5 is a partial explanatory view of an optical path shown in FIG. 3.

FIG. 5 is an explanatory view of an optical system for explaining the function of the reflection type HOE 2 of this embodiment. The reflection type HOE 2 is constituted by connecting the volume phase reflection type elementary HOEs 2-1, 2-2, and 2-3 without gaps.

Of these elementary HOEs, the elementary HOE 2-1 reflects light radiated from all points on the LCD 1-1, and projects the reflected light onto the pupil 7 of the left eye. Furthermore, the elementary HOE 2-1 has an optical power, and projects all the points on the LCD 1-1 on a portion 26 on a virtual image plane 21 as a virtual image.

For example, a light beam 17 radiated from a point 34 on the LCD 1-1 is reflected by the elementary HOE 2-1, and is incident as a reflected light beam 26 on the pupil 7 of the left eye. At this time, assuming an imaginary light beam 30 obtained by extending the reflected light beam 26 in a direction opposite to the light propagation direction, the imaginary light beam 30 converges at a point 25 on the virtual image plane 21. More specifically, the observer recognizes the reflected light beam 26 as if the light beam were radiated from the point 25 on the virtual image plane 21.

In the same manner as the elementary HOE 2-1, the elementary HOE 2-2 projects points on the LCD 1-2 on the pupil 7 of the left eye as points on a corresponding portion 27 on the virtual image plane 21, and the elementary HOE 2-3 projects points on the LCD 1-3 on the pupil 7 of the left eye as points on a corresponding portion 28 on the virtual image plane 21.

Connections of image information display screens on the LCD 1 will be described below. For example, a point 35-1 on the LCD 1-1 and a point 35-2 on the LCD 1-2 are an identical point on image data, as shown in FIG. 4.

Referring to FIG. 5, a light beam 18-1 radiated from the point 35-1 and incident on the elementary HOE 2-1 is reflected by the elementary HOE 2-1, and is incident on the pupil 7 of the left eye as a reflected light beam 27-1. A light beam 18-2 radiated from the point 35-2 and incident on the elementary HOE 2-2 is reflected by the elementary HOE 2-2, and is incident on the pupil 7 of the left eye as a reflected light beam 27-2.

In this embodiment, the elementary HOEs 2-1 and 2-2 are set, so that imaginary light beams 31-1 and 31-2 obtained by extending the reflected light beams 27-1 and 27-2 in directions opposite to their propagating directions converge at an identical point 24 on the virtual image plane 21.

Similarly, the elementary HOEs 2-1, 2-2, and 2-3 are set for all the points on the LCDs 1-1, 1-2, and 1-3 corresponding to positions on the joints of partial images in the same manner as the points 35-1 and 35-2.

Thus, three pieces of image information on the LCDs (1-1, 1-2, and 1-3) are connected without gaps, and are displayed as connected (continuous) single image information without gaps on the virtual image plane 21.

As a method of manufacturing the reflection type HOE 2, for example, the HOE 2 may be manufactured by adhering elementary HOEs (2-1, 2-2, and 2-3) independently obtained by a known 2-beam interference exposure method, or the elementary HOEs 2-1, 2-2, and 2-3 may be manufactured by masking an unnecessary portion of a single hologram substrate, and sequentially performing exposure three times on the hologram substrate (triple exposure method).

As a photosensitive material of a hologram, DCG, a photopolymer, and the like can be used. In this embodiment, the HOE is recorded by the triple exposure method using a photopolymer.

In this embodiments an observer recognizes three pieces of image information displayed on the LCDs 1-1, 1-2, and 1-3 as an image projected on the flat virtual image plane 21 by the reflection type elementary HOEs 2-1, 2-2, and 2-3. The virtual image plane 21 is not limited to a flat plane. For example, the virtual image plane 21 may be a cylindrical plane, which surrounds an observer. For this purpose, the power distribution of the reflection type elementary HOEs 2-1, 2-2, and 2-3 can be set to define the virtual image plane not as a flat plane but as a cylindrical plane.

Furthermore, as the reflection type elementary HOEs 2-1, 2-2, and 2-3 of this embodiment, a relief hologram on a surface of which a proper semi-transparent reflection film (e.g., a metal film) is deposited may be used.

In this embodiment, the three LCDs 1-1, 1-2, and 1-3 are arranged on a single plane. However, these LCDs need not always be arranged on a single plane but may be arranged on different planes. In addition, four or more LCDs may be arranged.

The same description as that of the respective elements for the left eye of the observer applies to the right eye. In this embodiment, identical image information may be displayed on the right and left eyes, or different image information having a parallax may be displayed for the right and left eyes, so that the observer can recognize a 3-dimensional image. Also, image information may be set, so that one eye recognizes a background image, and the other eye recognizes a foreground image.

In this embodiment, image information generated by the computer is used as image information. Alternatively, image information obtained by divisionally displaying an image from a TV camera or a VTR on the three LCDs 1-1, 1-2, and 1-3 by a computer or another method may be used.

Figure 6:
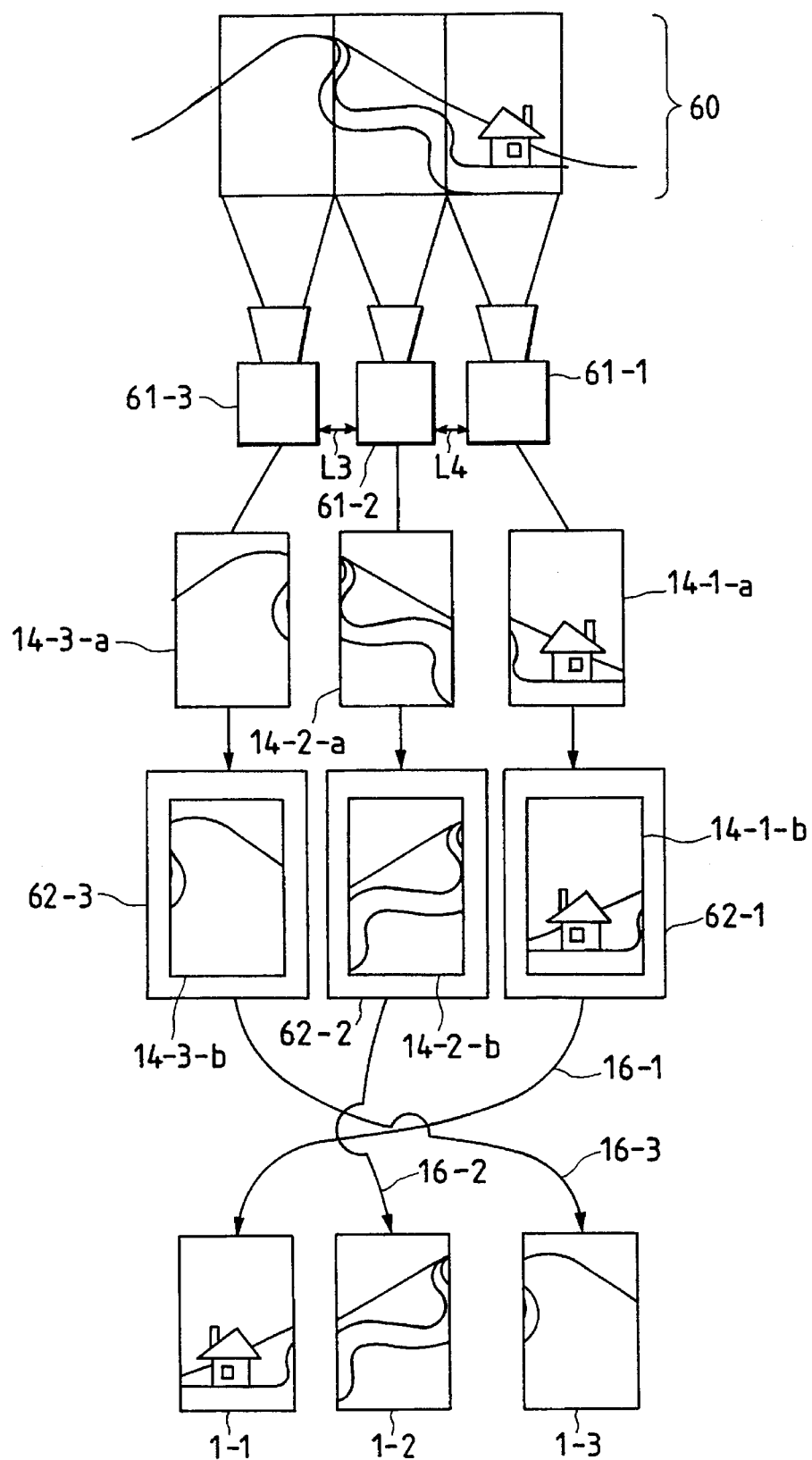
FIG. 6 is a schematic partial plan view when the apparatus shown in FIG. 3 is partially modified.

In addition, as shown in FIG. 6, an image obtained by divisionally displaying image information picked up using three TV cameras of the current NTSC level on the LCDs 1-1, 1-2, and 1-3, may be used.

FIG. 6 is an explanatory view showing processing steps of displaying image information picked up by three cameras. Three TV cameras 61-1, 61-2, and 61-3 pick up partial images obtained by dividing a landscape 60 into three images as image information. At this time, the vertical and horizontal directions of the three TV cameras are reversed with respect to a case wherein image information is normally picked up.

For this purpose, a mount for fixing the TV cameras horizontally may be used, or incident images may be converted into horizontal images by attaching prism attachments in front of photographing lenses of the TV cameras. In order to input the landscape 60 divided into three partial images without omissions and overlapping portions to the three TV cameras, distances L3 and L4 between the two adjacent TV cameras must be adjusted. For this purpose, the TV cameras are fixed by a mount with stages.

The landscape 60 is picked up as three pieces of image information 14-1-a, 14-2-a, and 14-3-a by the TV cameras 61-1, 61-2, and 61-3, and these pieces of image information are respectively converted into mirror images 14-1-b, 14-2-b, and 14-3-b by mirror image circuits 62-1, 62-2, and 62-3. These mirror images are then supplied to and displayed on the LCDs 1-1, 1-2, and 1-3.

As has been described above, the three pieces of image information displayed on the LCDs 1-1, 1-2, and 1-3 are projected onto the pupil of the observer, so that they are connected as single image information by the reflection type HOE, and are observed as an image similar to the landscape 60.

As described above, according to the present invention, high-definition image information can be displayed on a large screen having a remarkably large number of pixels using existing LCDs.

Figure 7:
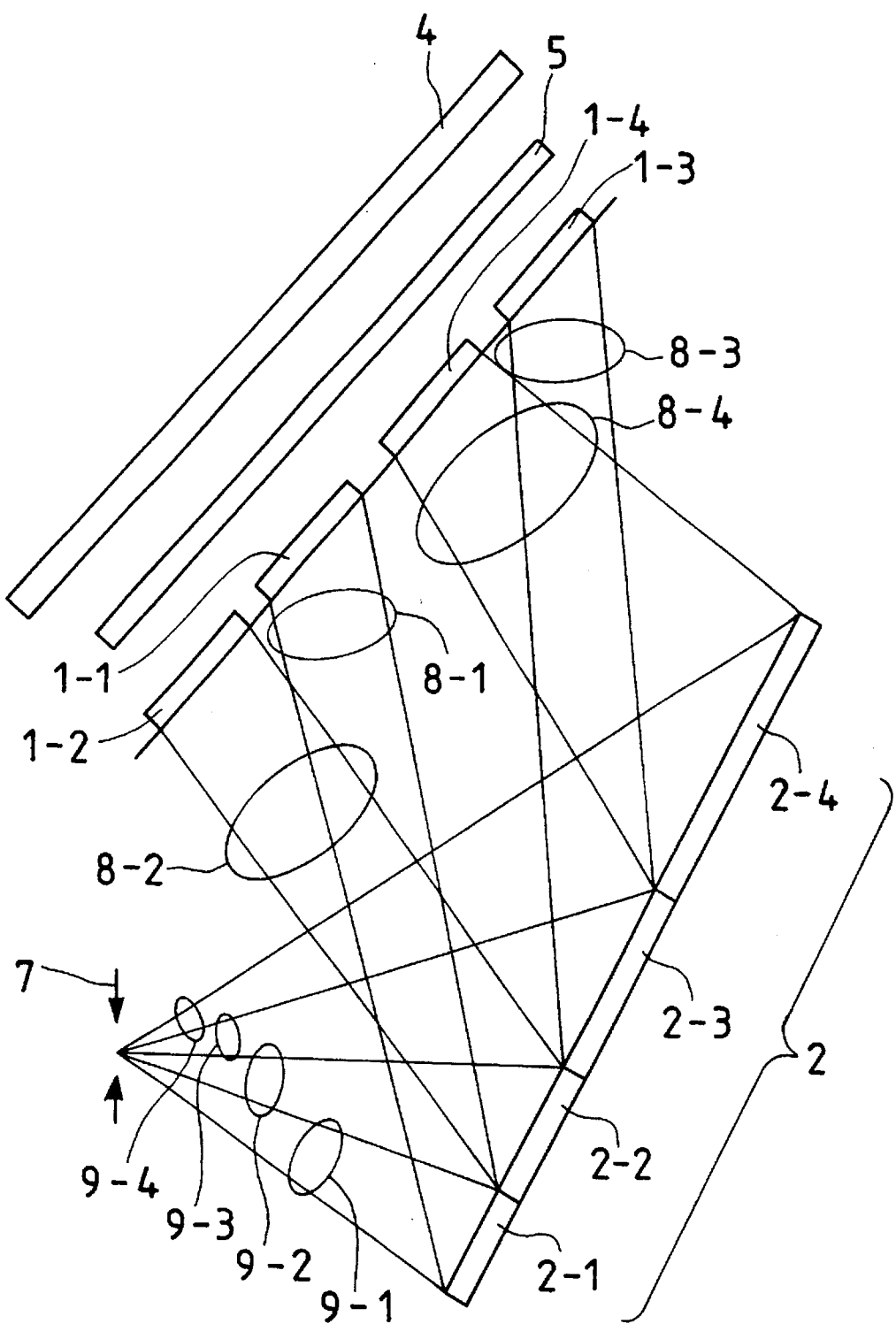
FIG. 7 is a schematic partial plan view showing the second embodiment of the present invention.

FIG. 7 is a schematic partial plan view showing the second embodiment of the present invention. FIG. 7 illustrates elements for only the left eye of an observer as in the first embodiment shown in FIG. 3, and the same reference numerals in FIG. 7 denote the same parts as in FIG. 3.

In this embodiment, four LCDs (1-1, 1-2, 1-3, and 1-4) are used as image display elements. Also, four elementary hologram optical elements (elementary HOEs) 2-1, 2-2, 2-3, and 2-4 are used as a hologram optical element 2, and are connected to each other without any gaps.

Referring to FIG. 5, some light components of a light beam from a point 35-1 on the LCD 1-1 are incident on an elementary HOE other than the corresponding elementary HOE 2-1, e.g., on the elementary HOE 2-2. Although the amount of light from the point 35-1 and reflected by the elementary HOE 2-2 is small due to the angular selectivity, as a volume phase type hologram, of the elementary HOE 2-2, it is difficult to perfectly cut reflected light since the point 35-1 is spatially close to a point 35-2. As a result, some light components of a light beam from the point 35-1 are reflected by the elementary HOE 2-2, and the reflected light may become incident on the left eye as a ghost. The embodiment shown in FIG. 7 can prevent generation of such a ghost.

More specifically, in this embodiment, the four LCDs and the corresponding four elementary HOEs are arranged to have different incident angles. Thus, the incident angle of a light beam from an LCD (1-1, 1-2, 1-3, or 1-4) corresponding to a given elementary HOE (2-1, 2-2, 2-3, or 2-4) is largely different from the incident angles of light beams from other LCDs to the given elementary HOE, thereby eliminating generation of a ghost.

The characteristic feature of this embodiment will be described below.

Referring to FIG. 7, the LCDs (1-1, 1-2, 1-3, and 1-4) display different image information, and are illuminated with a light beam from a backlight light source 4 via a diffraction grating 5. The diffraction grating 5 improves illumination efficiency. Light beams 8-1, 8-2, 8-3, and 8-4 having the image information on the LCDs 1 are incident on the corresponding elementary HOEs 2-1 to 2-4.

In this case, the light beam 8-1 from the LCD 1-1, the light beam 8-2 from the LCD 1-2, the light beam 8-3 from the LCD 1-3, and the light beam 8-4 from the LCD 1-4 are incident on the corresponding elementary HOEs 2-1, 2-2, 2-3, and 2-4 to cross each other. The elementary HOEs 2-1, 2-2, 2-3, and 2-4 respectively reflect the light beams 8-1, 8-2, 8-3, and 8-4 including the image information, and project them onto a pupil 7 of the left eye as reflected light beams 9-1, 9-2, 9-3, and 9-4.

An observer connects image information displayed on the LCDs 1-1, 1-2, 1-3, and 1-4 without any gaps on the basis of the four light beams 9-1, 9-2, 9-3, and 9-4 incident on his or her left eye without any gaps on the basis of the image information on the LCDs 1-1, 1-2, 1-3, and 1-4, and visually observes them as single large image information.

Figure 8:
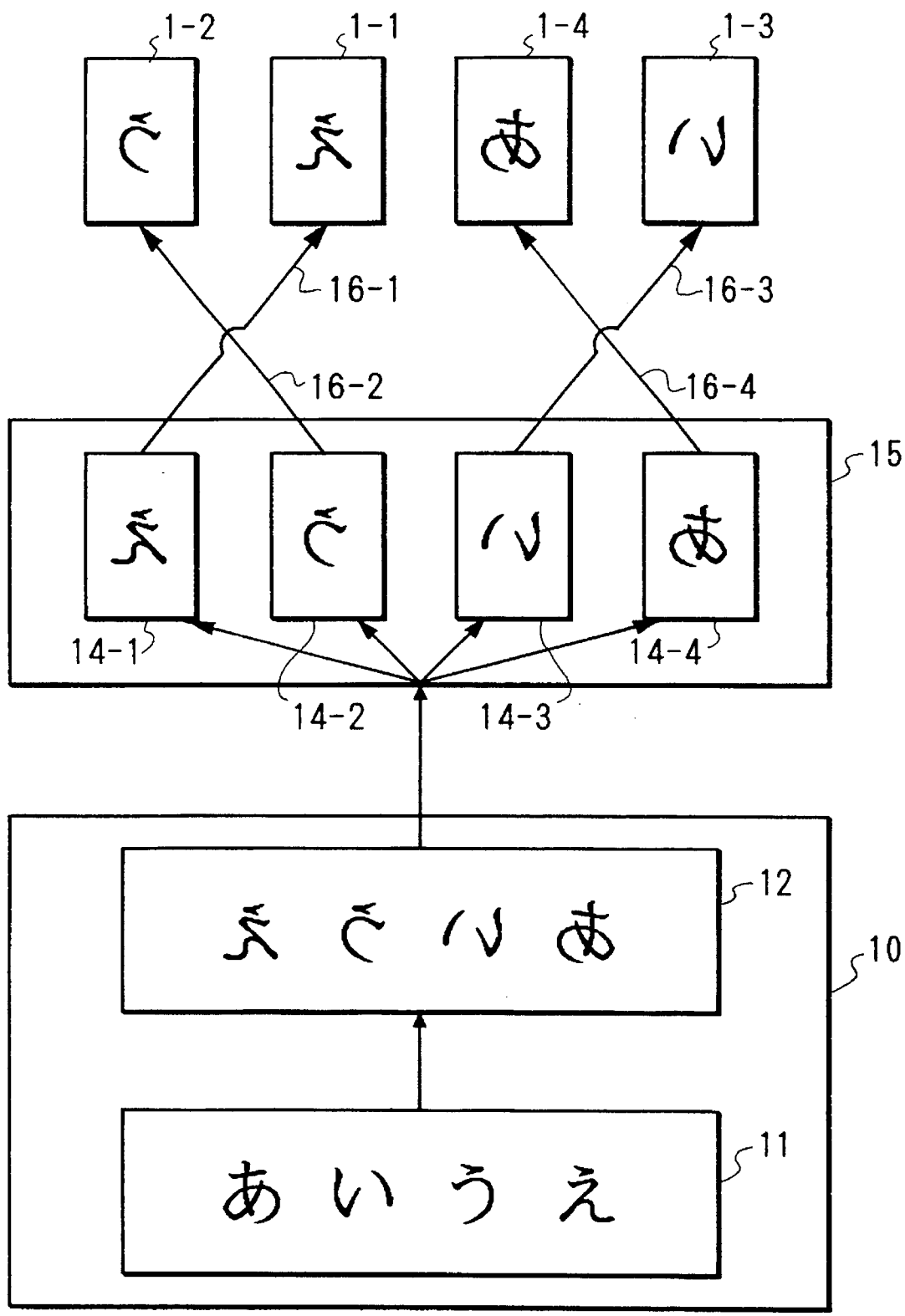
FIG. 8 is an explanatory view of an image display element shown in FIG. 7.

FIG. 8 is an explanatory view showing processing steps of dividing single large image information into four pieces of information, and divisionally displaying the four pieces of information on the four LCDs 1-1, 1-2, 1-3, and 1-4 in this embodiment.

An image 11 is generated by a computer 10, and is converted into a mirror image 12. Thereafter, the mirror image 12 is supplied to an image dividing circuit 15. The image dividing circuit 15 divides the mirror image 12 into partial images 14-1, 14-2, 14-3, and 14-4 to be displayed on the four LCDs 1-1, 1-2, 1-3, and 1-4. The partial images 14-1, 14-2, 14-3, and 14-4 are supplied to and displayed on the LCDs 1-1, 1-2, 1-3, and 1-4 via signal lines 16-1, 16-2, 16-3, and 16-4.

The optical function of the elementary HOEs 2-1, 2-2, 2-3, and 2-4 will be described below.

Referring to FIG. 7, the HOE 2 is constituted by connecting the elementary HOEs 2-1, 2-2, 2-3, and 2-4 as four different volume phase reflection type holograms without any gaps.

Of these HOEs, the elementary HOE 2-1 is set to substantially cause Bragg diffraction with respect to the light beam 8-1 having image information from the LCD 1-1, thereby generating the reflected light beam 9-1. The elementary HOE 2-2 is set to substantially cause Bragg diffraction with respect to the light beam 8-2 having image information from the LCD 1-2, thereby generating the reflected light beam 9-2.

The elementary HOE 2-3 is set to substantially cause Bragg diffraction with respect to the light beam 8-3 having image information from the LCD 1-3, thereby generating the reflected light beam 9-3. The elementary HOE 2-4 is set to substantially cause Bragg diffraction with respect to the light beam 8-4 having image information from the LCD 1-4, thereby generating the reflected light beam 9-4. The HOE 2 projects points on the LCDs 1-1, 1-2, 1-3, and 1-4 on a virtual image plane (not shown) in FIG. 7 as a virtual image, and allows an observer to observe an enlarged image similar to the image information shown in FIG. 8 on the virtual image plane, like in the reflection type HOE 2 in the first embodiment.

In this embodiment, the light beams 8-1 and 8-2 from the LCDs 1-1 and 1-2 are incident on the corresponding elementary HOEs 2-1 and 2-2 to cross each other. Also, the light beams 8-3 and 8-4 from the LCDs 1-3 and 1-4 are incident on the corresponding elementary HOEs 2-3 and 2-4 to cross each other.

With this arrangement, stray light beams from LCDs other than the corresponding one of the LCDs 1-1, 1-2, 1-3, and 1-4 are incident on each of the elementary HOEs 2-1, 2-2, 2-3, and 2-4 at incident angles considerably different from those of the light beams 8-1, 8-2, 8-3, and 8-4 regularly incident on the corresponding HOEs.

As has been described above, the elementary HOEs 2-1, 2-2, 2-3, and 2-4 are set to substantially cause Bragg diffraction to the light beams 8-1, 8-2, 8-3, and 8-4, respectively. For this reason, stray light from LCDs other than the corresponding LCD and incident on non-corresponding elementary HOEs is not diffracted by the elementary HOEs due to the angular selectivity of the HOEs, and is transmitted therethrough. As a result, such stray light can be prevented from being incident on the pupil 7 of the left eye.

This embodiment can effectively eliminate generation of a ghost in this manner.

Figure 9:
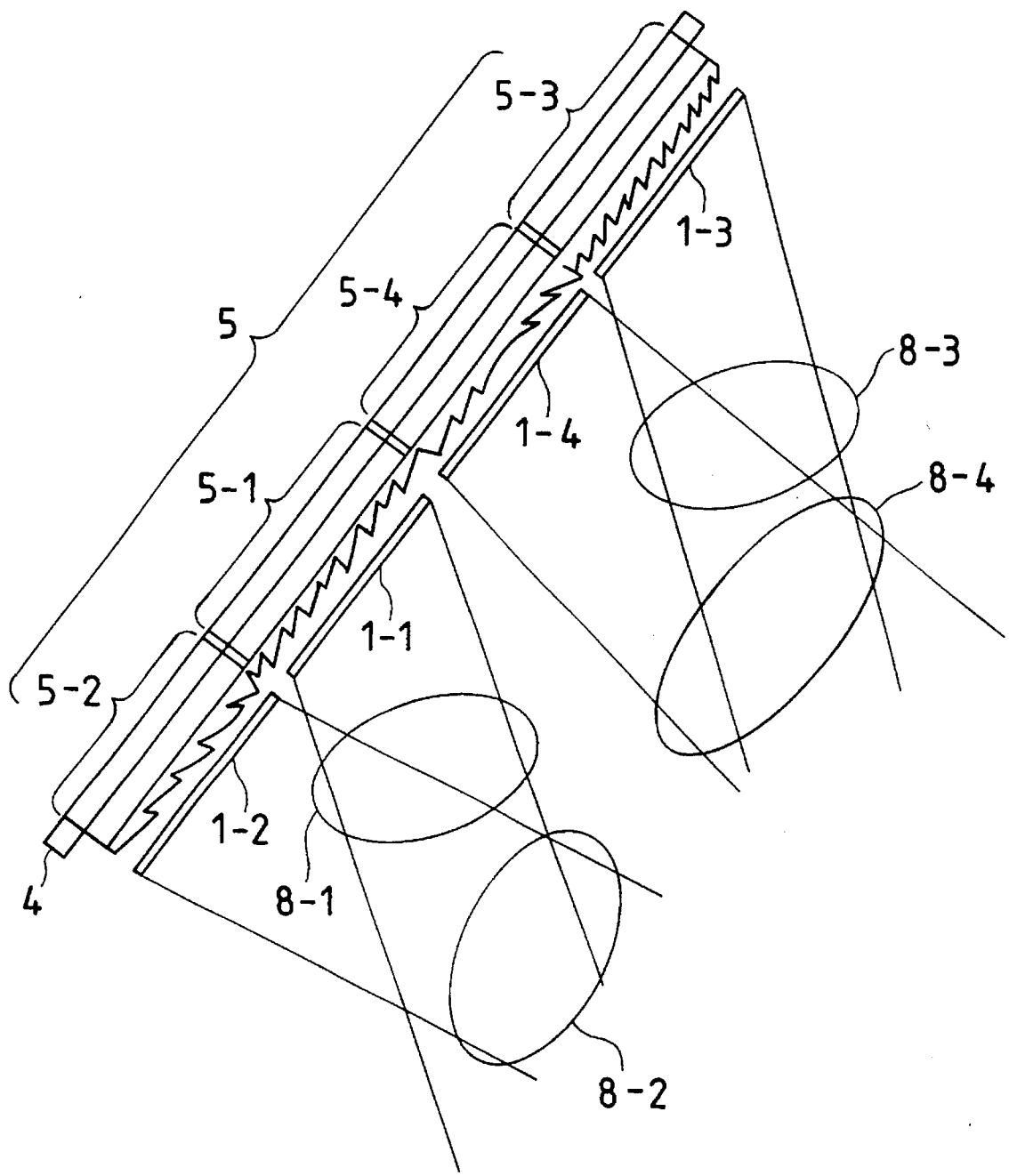
FIG. 9 is an explanatory view of an optical effect of a diffraction grating shown in FIG. 7.

FIG. 9 is an explanatory view showing the optical function of the diffraction grating 5 of this embodiment. The diffraction grating 5 is constituted by connecting four blade transmission type elementary diffraction gratings 5-1, 5-2, 5-3, and 5-4. The elementary diffraction gratings 5-1, 5-2, 5-3, and 5-4 deflect a light beam from the backlight light source 4 to efficiently illuminate the LCDs 1-1, 1-2, 1-3, and 1-4, thereby generating the light beams 8-1, 8-2, 8-3, and 8-4. Note that a volume phase type hologram may be used in place of the diffraction grating 5 in this embodiment. Also, a Fresnel lens may be used.

Figure 10:
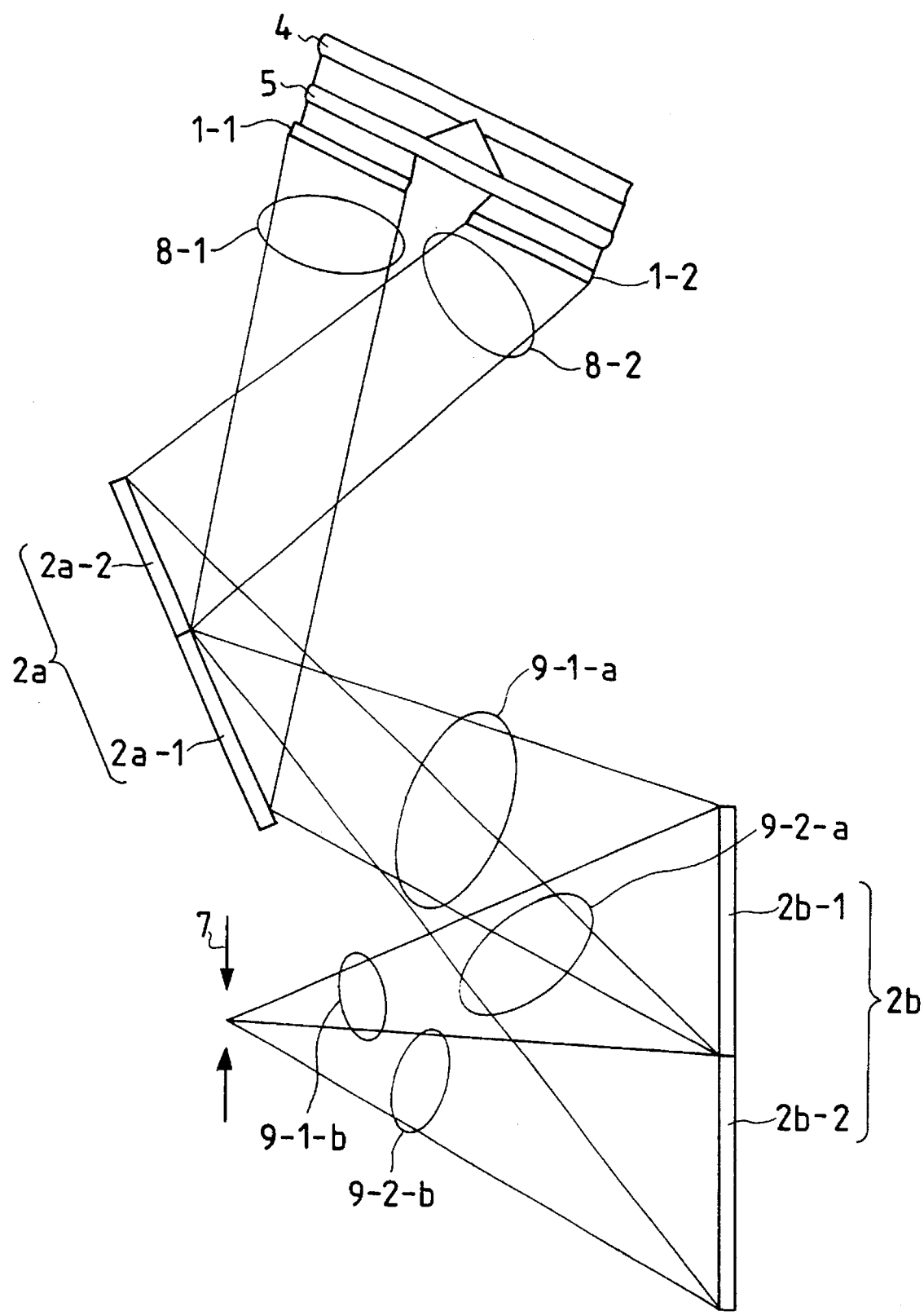
FIG. 10 is a schematic partial plan view showing the third embodiment of the present invention.

FIG. 10 is a schematic partial plan view showing the third embodiment of the present invention. FIG. 10 illustrates elements for only the left eye of an observer as in the first embodiment shown in FIG. 3, and the same reference numerals in FIG. 10 denote the same parts as in FIG. 3.

In this embodiment, a light beam from an image display element (LCD) 1 is reflection-diffracted twice using two reflection type hologram optical elements (HOEs 2a and 2b) so as to eliminate a chromatic aberration generated by the holograms, thus allowing observation of satisfactory image information.

Referring to FIG. 10, two LCDs 1-1 and 1-2 are arranged. A reflection type HOE 2a is constituted by connecting two different elementary HOEs 2a-1 and 2a-2. A reflection type HOE 2b is constituted by connecting two different elementary HOEs 2b-1 and 2b-2 without any gaps (in the HOE 2a, the two elementary HOEs 2a-1 and 2a-2 may be arranged to be separated from each other within an allowable range or may be arranged on different planes).

In this embodiment, the LCDs 1-1 and 1-2 display different image information, and are effectively illuminated with a light beam from a backlight light source 4 via a diffraction grating 5. A light beam 8-1 (8-2) from the LCD 1-1 (1-2) is incident on the elementary HOE 2a-1 (2a-2). The elementary HOE 2a-1 reflects the incident light beam 8-1, and radiates it on the elementary HOE 2b-1 as a reflected light beam 9-1-a. The elementary HOE 2a-1 reflects the incident light beam 8-2, and radiates it onto the elementary HOE 2b-2 as a reflected light beam 9-2-a.

Furthermore, the elementary HOE 2b-1 reflects the light beam 9-1-a, and guides it to a pupil 7 of the left eye as a reflected light beam 9-1-b. The elementary HOE 2b-2 reflects the light beam 9-2-a, and guides it to the pupil 7 of the left eye as a reflected light beam 9-2-b. The light beams 9-1-b and 9-2-b respectively have image information displayed on the LCDs 1-1 and 1-2. An observer can recognize image information displayed on the LCDs 1-1 and 1-2, and connected to each other without any gaps.

Figure 11:
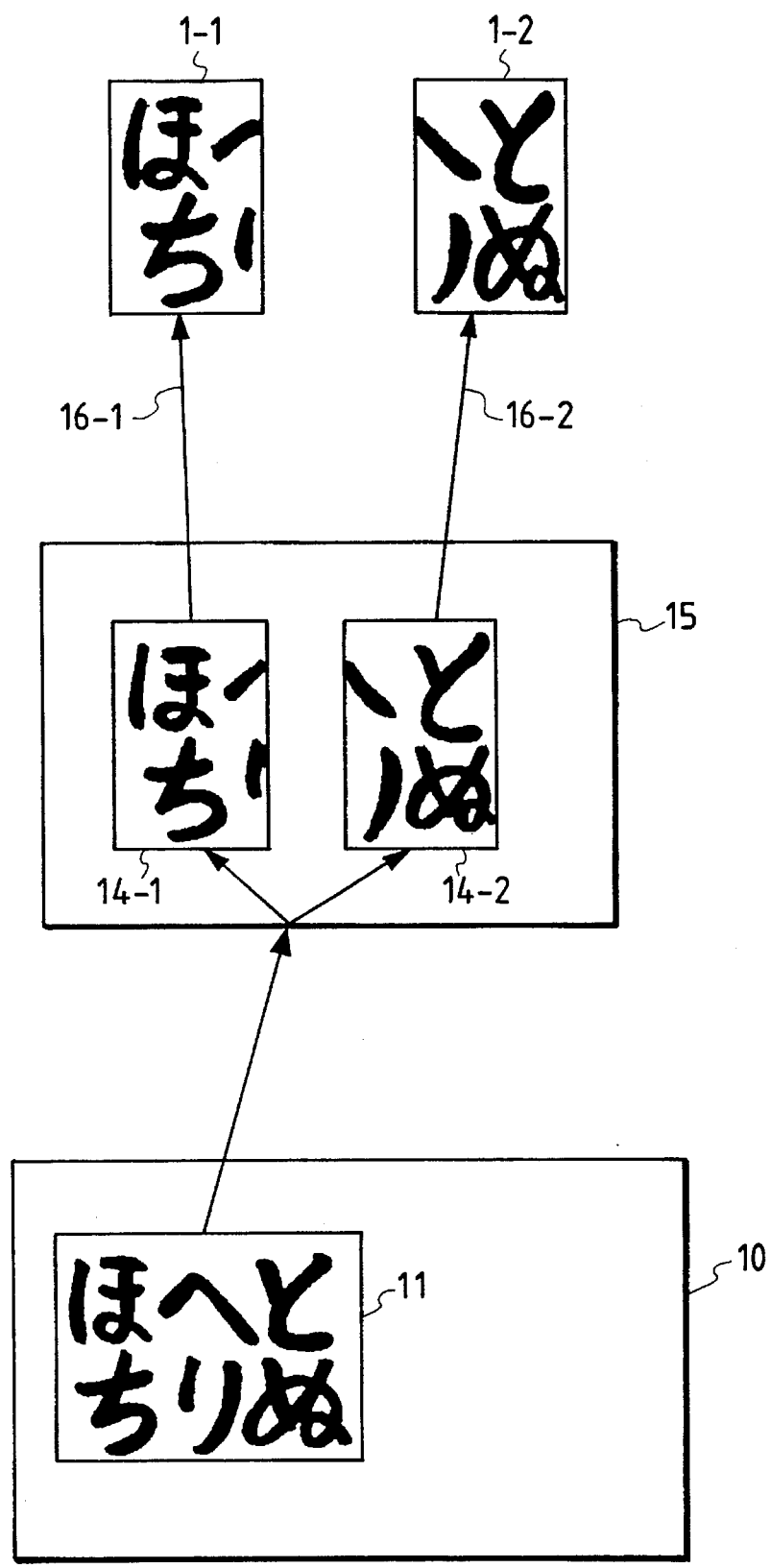
FIG. 11 is an explanatory view of an image display element shown in FIG. 10.

FIG. 11 is an explanatory view of processing steps for dividing single large image information into two pieces of information, and divisionally displaying the two pieces of image information on the two LCDs 1-1 and 1-2.

Referring to FIG. 11, a computer 10 generates an image 11, and supplies it to an image dividing circuit 15. The image dividing circuit 15 divides the image 11 into two partial images 14-1 and 14-2 so as to display it on the LCDs 1-1 and 1-2. Of these partial images, the partial image 14-1 is supplied to the LCD 1-1 via a signal line 16-1, and the partial image 14-2 is supplied to the LCD 1-2 via a signal line 16-2. The LCDs 1-1 and 1-2 respectively display the partial images 14-1 and 14-2.

The optical functions of the reflection type HOEs 2a and 2b will be explained below.

Referring to FIG. 10, the elementary HOE 2a-1 is set to substantially cause Bragg diffraction of the light beam 8-1 from the LCD 1-1. The elementary HOE 2a-2 is set to substantially cause Bragg diffraction of the light beam 8-2 from the LCD 1-2.

The LCDs 1-1 and 1-2, and the elementary HOEs 2a-1 and 2a-2 are arranged, so that the light beams 8-1 and 8-2 from the LCDs 1-1 and 1-2 are incident on the elementary HOEs 2a-1 and 2a-2 to cross each other. Stray light from the LCD 1-1 is incident on the elementary HOE 2a-2 at an angle considerably different from that of the regular light beam 8-2 incident from the LCD 1-2 onto the elementary HOE 2a-2.

Also, stray light from the LCD 1-2 is incident on the elementary HOE 2a-1 at an angle considerably different from that of the regular light beam 8-1 incident from the LCD 1-1 onto the elementary HOE 2a-1. For this reason, stray light incident from the LCD 1-2 onto the elementary HOE 2a-1 and stray light incident from the LCD 1-1 onto the elementary HOE 2a-2 are not diffracted but are transmitted through the corresponding elementary HOEs 2a-1 and 2a-2, and do not become incident on the elementary HOEs 2b-1 and 2b-2. Therefore, such stray light does not finally reach the pupil 7 of the observer. In this embodiment, generation of a ghost is prevented like in the second embodiment.

In this embodiment, the light beam 8-1 (8-2) having image information from the LCD 1-1 (1-2) is diffracted twice by the elementary HOEs 2a-1 and 2b-1 (the elementary HOEs 2a-2 and 2b-2), thereby providing the following effects. That is, a chromatic aberration generated upon diffraction by the HOE can be eliminated, and a mirror image of an image to be displayed need not be formed.

Figure 12:
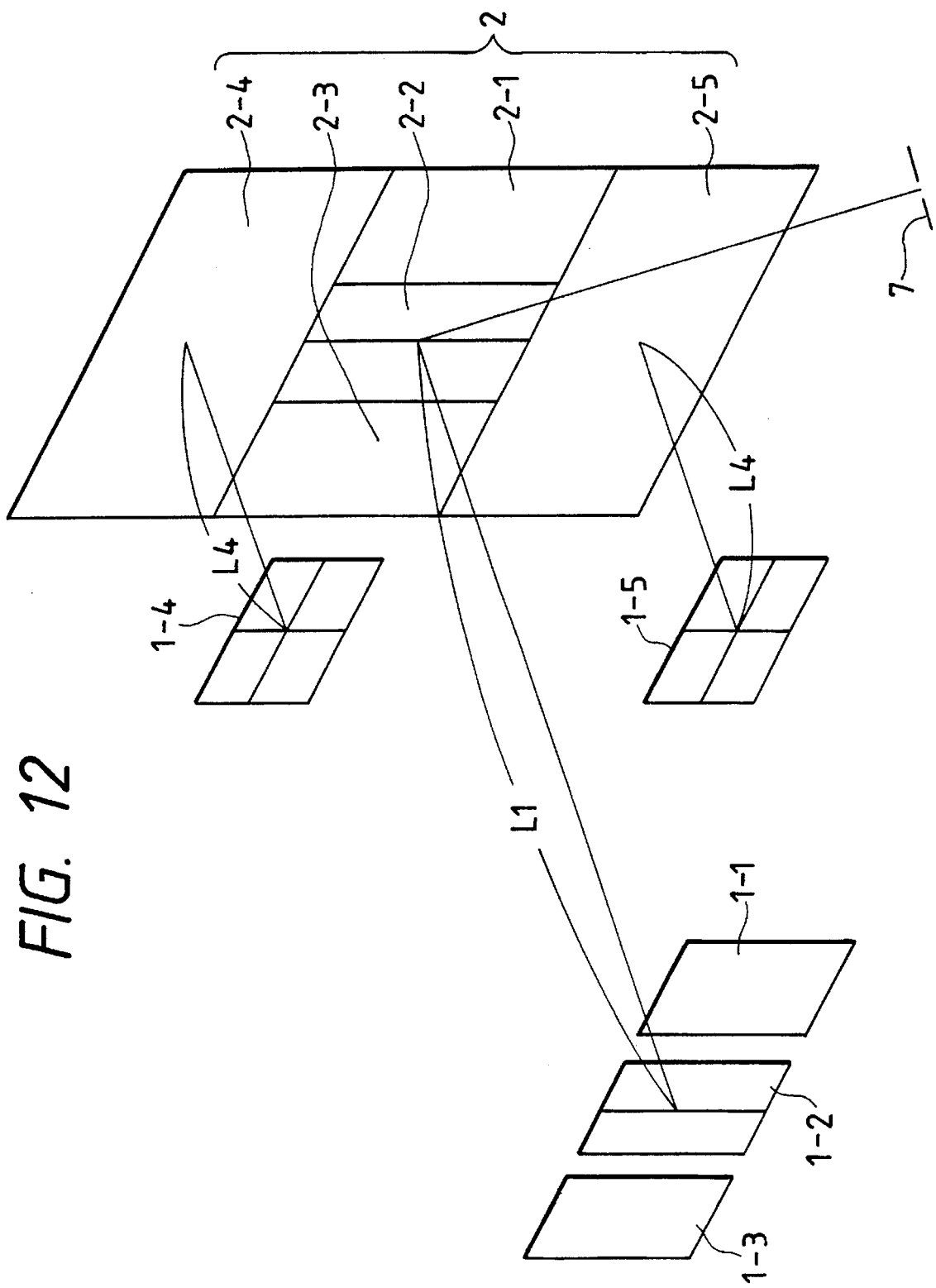
FIG. 12 is a schematic partial plan view showing the fourth embodiment of the present invention.

FIG. 12 is a schematic partial plan view showing the fourth embodiment of the present invention.

As the characteristic feature of this embodiment, the entire image information to be observed by an observer is not equally displayed with high definition, and only an image area frequently observed by the observer is displayed with particularly high definition.

In this embodiment, image information is divided into a plurality of (five) regions, and of these regions, three image information regions are displayed with higher definition than other regions.

Referring to FIG. 12, LCDs 1-1 to 1-5 have the same specifications, and are illuminated with a light beam from a backlight light source (not shown) via a diffraction grating (not shown) for improving illumination efficiency in the same manner as in the above-mentioned embodiments.

The LCDs 1-1, 1-2, and 1-3 are arranged on a plane separated by a distance L1 from a reflection type HOE 2, and the LCDs 1-4 and 1-5 are arranged on a plane separated by a distance L4 from the reflection type HOE 2. The LCDs 1-1 to 1-5 display different image information. A light beam having image information displayed on the LCD 1-1 is incident on an elementary HOE 2-1, is reflected by the elementary HOE 2-1, and is then incident on a pupil 7 of an observer.

Similarly, a light beam from the LCD 1-2 (1-3, 1-4, 1-5) is reflected by an elementary HOE 2-2 (2-3, 2-4, 2-5), and is incident on the pupil 7 of the observer.

The observer connects five pieces of image information displayed on the LCDs 1-1 to 1-5 via the HOE 2, and observes them as continuous single large image information.

The reflection type HOE 2 comprises a volume phase reflection type hologram, and is constituted by connecting the five elementary HOEs 2-1, 2-2, 2-3, 2-4, and 2-5 without any gaps.

Figure 13:
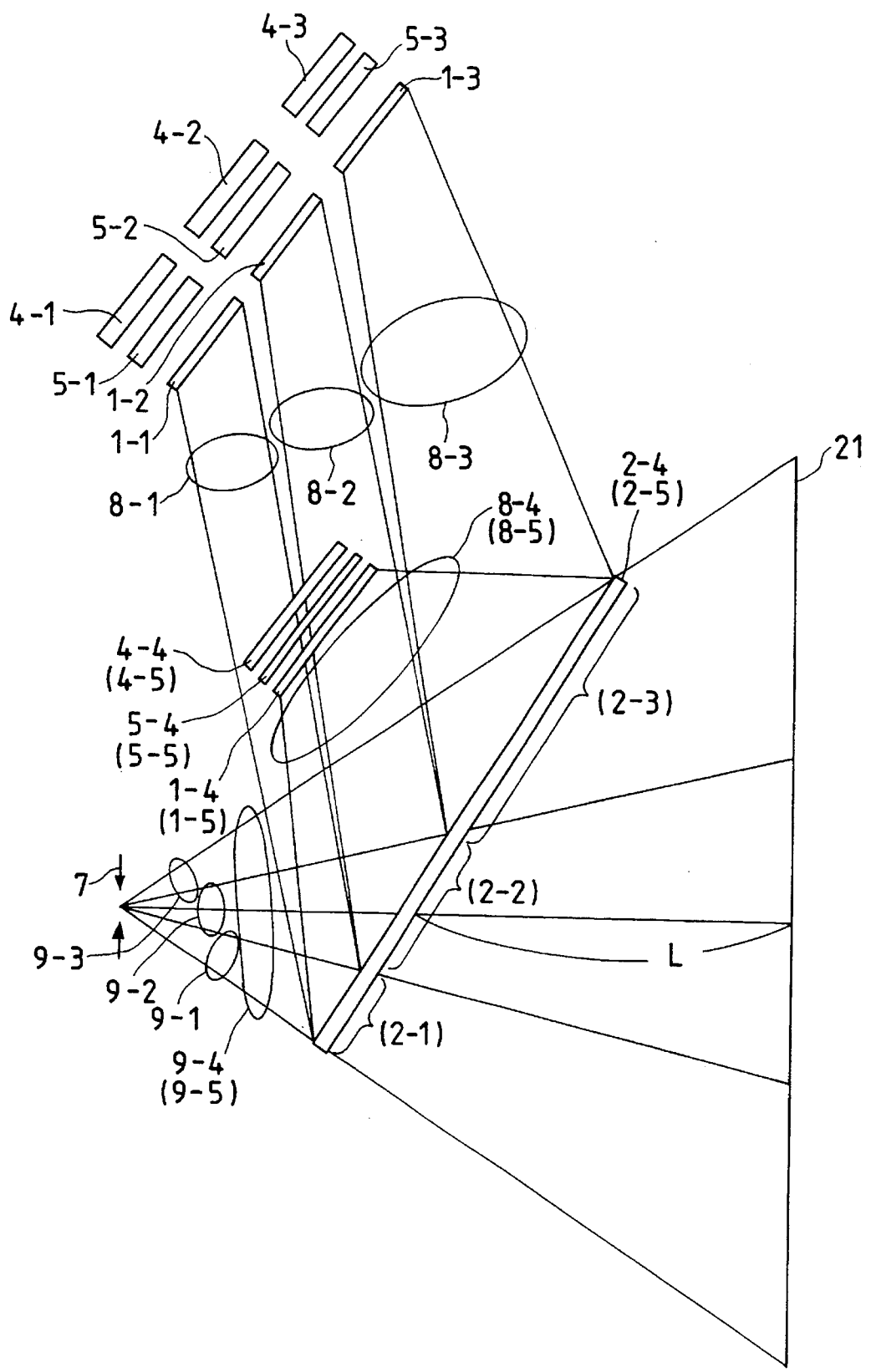
FIG. 13 is an explanatory view of an optical path in FIG. 12.

FIG. 13 is a schematic plan view showing an optical system of this embodiment when viewed from a position above the head of the observer.

Referring to FIG. 13, backlight light sources 4-1 to 4-5 respectively illuminate the LCDs 1-1 to 1-5. Diffraction gratings 5-1 to 5-5 deflect light beams from the backlight light sources 4-1 to 4-5 to effectively illuminate the LCDs 1-1 to 1-5.

Note that FIG. 13 does not illustrate the backlight light source 4-5, the diffraction grating 5-5, and the elementary HOEs 2-1, 2-2, 2-3, and 2-5 since they are located behind the backlight light source 4-4, the diffraction grating 5-4, and the elementary HOE 2-4 and cannot be seen.

In this embodiment, the LCDs (1-1 to 1-5) display different image information, and are illuminated with light beams from the backlight light sources (4-1 to 4-5) opposing the LCDs (1-1 to 1-5) via the corresponding diffraction gratings (5-1 to 5-5). The light beams (8-1 to 8-5) including image information of the LCDs (1-1 to 1-5) are respectively incident on the elementary HOEs (2-1 to 2-5). The elementary HOEs (2-1 to 2-5) respectively reflect these light beams (8-1 to 8-5), and guide them to the pupil of the observer as reflected light beams (9-1 to 9-5).

The observer recognizes image information displayed on the LCDs (1-1 to 1-5) as single large image information connected without any gaps on the basis of the five light beams (9-1 to 9-5) having image information of the LCDs (1-1 to 1-5) and incident on the pupil 7 of the left eye without any gaps.

Note that a virtual image plane 21 in FIG. 13 is separated by a predetermined distance L (e.g., 1 m) from the HOE 2. The elementary HOEs 2-1, 2-2, 2-3, 2-4, and 2-5 respectively cause the observer to recognize points on the LCDs 1-1, 1-2, 1-3, 1-4, and 1-5 as virtual image points on the virtual image plane 21 in the same manner as the elementary HOEs in the first embodiment described above.

Figure 14:
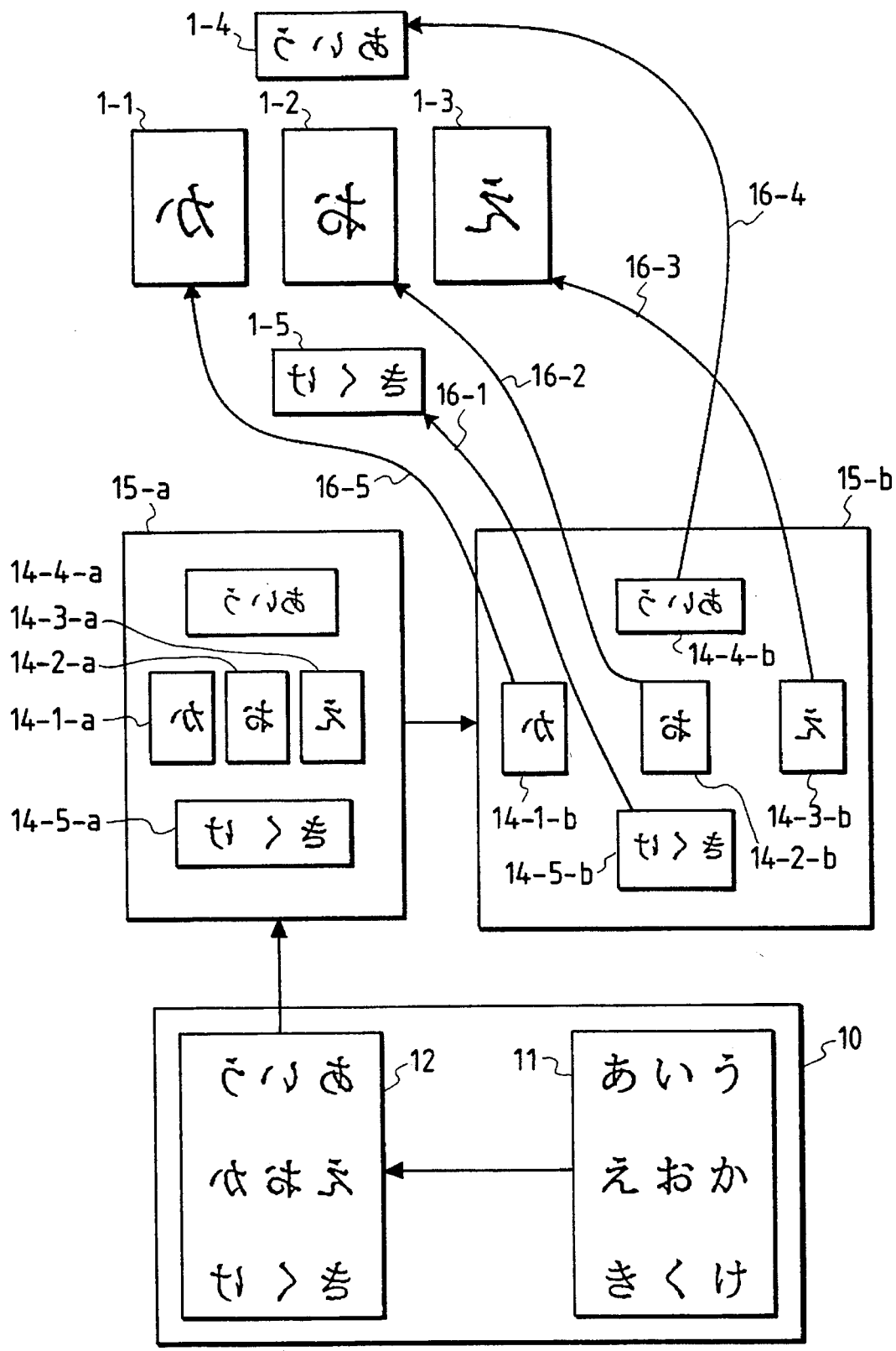
FIG. 14 is an explanatory view of an image display element shown in FIG. 12.

FIG. 14 is an explanatory view showing processing steps of non-equally dividing single large image information into five pieces of image information, enlarging/reducing the five pieces of image information at non-equal magnifications, and divisionally displaying them on the five LCDs.

A computer 10 generates an image 11, and the image 11 is converted into a mirror image 12. Thereafter, the mirror image 12 is supplied to an image dividing circuit 15-$a$. The image dividing circuit 15-$a$ non-equally divides the mirror image 12 into five partial images 14-1-$a$, 14-2-$a$, 14-3-$a$, 14-4-$a$, and 14-5-$a$ to be displayed on the LCDs 1-1, 1-2, 1-3, 1-4, and 1-5.

If the number of pixels constituting the original image 11 is represented by M, this division is made, so that each of the partial images 14-4-$a$ and 14-5-$a$ is constituted by $m_{max}$ pixels, and each of the partial images 14-1-$a$, 14-2-$a$, and 14-3-$a$ is constituted by $m_{min}$ pixels.

In this case, $m_{max}$ and $m_{min}$ are respectively defined by:

$$m_{max} \approx \frac{\left(\frac{L}{L_4}\right)^2 \times M}{\left(\frac{L}{L_1}\right)^2 \times 3 + \left(\frac{L}{L_4}\right)^2 \times 2} =$$

$$\frac{\left(\frac{1}{L_4}\right)^2 \times M}{\left(\frac{1}{L_1}\right)^2 \times 3 + \left(\frac{1}{L_4}\right)^2 \times 2}$$

$$m_{min} \approx \frac{\left(\frac{L}{L_1}\right)^2 \times M}{\left(\frac{L}{L_1}\right)^2 \times 3 + \left(\frac{L}{L_4}\right)^2 \times 2}$$

Also, the value M obtained by converting the number of data constituting the original image 11 into the number of pixels is determined to satisfy $m_{min} \approx m_{LCD}$ and $m_{min} \geq m_{LCD}$ (where $m_{LCD}$ is the number of pixels of the LCD 1 used in this embodiment).

The five partial images 14-1-$a$, 14-2-$a$, 14-3-$a$, 14-4-$a$, and 14-5-$a$ divided by the image dividing circuit 15-$a$ are supplied to a sampling circuit 15-$b$. The sampling circuit 15-$b$ converts the partial images 14-1-$a$, 14-2-$a$, and 14-3-$a$ into image data 14-1-$b$, 14-2-$b$, and 14-3-$b$ having the same number of data as the number $m_{LCD}$ of pixels of the LCD, and supplies these image data to the LCDs 1-1, 1-2, and 1-3. Also, the sampling circuit 15-$b$ samples the partial images 14-4-$a$ and 14-5-$a$ to convert them into image data 14-4-$b$ and 14-5-$b$ having the same number of data as the number $m_{LCD}$ of pixels of the LCD, and supplies them to the LCDs 1-4 and 1-5. Since the distance L1 between the LCDs 1-1, 1-2, and 1-3, and the HOE 2 is larger than the distance L4 between the LCDs 1-4 and 1-5, and the HOE 2, $m_{min}$ and $m_{max}$ satisfy $m_{max} > m_{min}$, and $m_{min} \approx m_{LCD}$, the partial images 14-4-$b$ and 14-5-$b$ are converted into coarse data having a smaller number of data than that of the partial image data 14-4-$a$ and 14-5-$a$ before sampling.

Images displayed on the LCDs 1-4 and 1-5 are reduced at a ratio of L4/L1 with respect to images displayed on the LCDs 1-1, 1-2, and 1-3.

Image information observed by an observer will be explained below.

Referring to FIG. 12, since the distance between the LCDs 1-1, 1-2, and 1-3, and the HOE 2 is L1, the distance between the LCDs 1-4 and 1-5, and the HOE 2 is L4, and the distance between the HOE 2 and a virtual image plane (not shown) in FIG. 12 is L, the observer recognizes image information on the LCDs 1-1, 1-2, and 1-3 as a virtual image in an enlarged scale of L/L1 on the virtual image plane, and recognizes images on the LCDs 1-4 and 1-5 as a virtual image in an enlarged scale of L/L4 on the virtual image plane.

Images displayed on the LCDs 1-4 and 1-5 are displayed in a reduced scale of L4/L1 with respect to images displayed on the LCDs 1-1 to 1-3, and are displayed for the observer on the virtual image plane in an enlarged scale of L/L4.

The above-mentioned reduced and enlarged scales cancel each other, and the partial images 14-1-$a$ to 14-3-$a$, and the partial images 14-4-$a$ and 14-5-$a$ in FIG. 14 are consequently observed by an observer at an equal magnification, and an image to be observed by the observer corresponds to an image obtained by projecting the image 11 in FIG. 14 onto the virtual image plane 21 in an enlarged scale of L/L1.

In the image 11 in FIG. 14, the observer recognizes that a portion to be observed by the observer based on images displayed on the LCDs 1-1, 1-2, and 1-3, and a portion to be observed by the observer based on images displayed on the LCDs 1-4 and 1-5 have different areas. However, since each of these partial images has the same number of pixels, an image portion observed based on the images displayed on the LCDs 1-1, 1-2, and 1-3 is observed by the observer as an image having higher definition than an image portion observed based on the images displayed on the LCDs 1-4 and 1-5.

Figure 15:
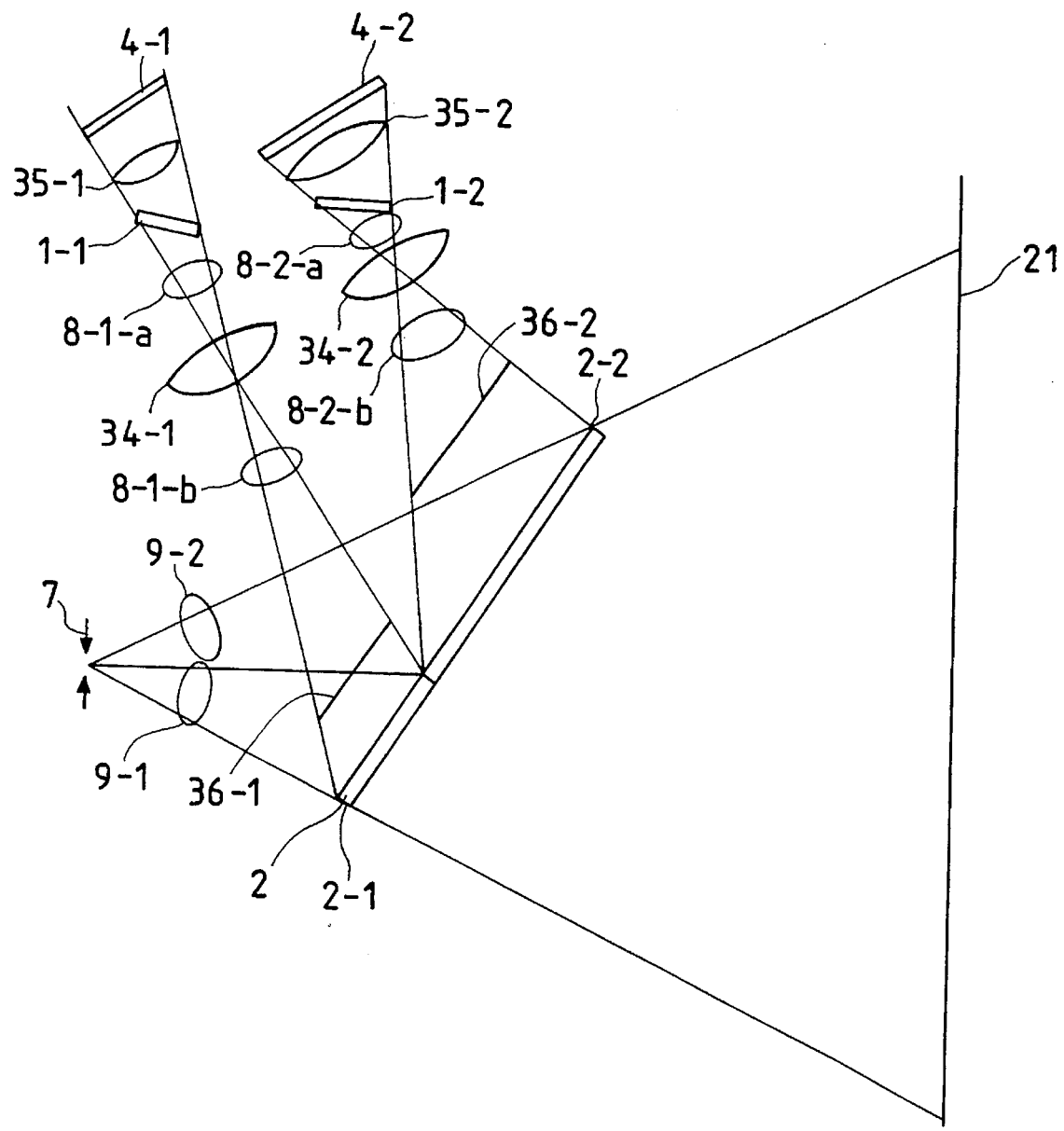
FIG. 15 is a schematic partial plan view showing the fifth embodiment of the present invention.

FIG. 15 is a schematic partial plan view showing the fifth embodiment of the present invention.

Referring to FIG. 15, LCDs 1-1 and 1-2 display different image information. The LCDs 1-1 and 1-2 are illuminated with light beams emitted from corresponding backlight light sources 4-1 and 4-2 and focused by corresponding condenser lenses 35-1 and 35-2. The LCDs 1-1 and 1-2 output light beams 8-1-$a$ and 8-2-$a$ having image information displayed thereon. Imaging lenses 34-1 and 34-2 form images of the LCDs 1-1 and 1-2 as intermediate images 36-1 and 36-2, and convert the light beams 8-1-$a$ and 8-2-$a$ into light beams 8-1-$b$ and 8-2-$b$, respectively.

A reflection type HOE 2 is constituted by connecting elementary HOEs 2-1 and 2-2 without any gaps as in the reflection type HOE in the first embodiment described previously. The HOE 2 reflects the light beams 8-1-$b$ and 8-2-$b$, and radiates them onto a pupil 7 of an observer as reflected light beams 9-1 and 9-2.

Like in the embodiments described above, an observer recognizes image information displayed on the LCDs 1-1 and 1-2 as single large image information projected onto a virtual image plane 21 and connected without any gaps.

If the magnification between the LCD 1-1 and the intermediate image 36-1 is represented by $m_{1-a}$, the magnification between the LCD 1-2 and the intermediate image 36-2 is represented by $m_{2-a}$, the magnification between the intermediate image 36-1 and a virtual image on the virtual image plane 21 is represented by $m_{1-b}$, and the magnification between the intermediate image 36-2 and a virtual image on the virtual image plane 21 is represented by $m_{2-b}$, the LCDs 1-1 and 1-2, the imaging lenses 34-1 and 34-2, the elementary HOEs 2-1 and 2-2, and the like are set to satisfy $m_{1-a} \times m_{1-b} = m_{2-a} \times m_{2-b}$.

Figure 16:
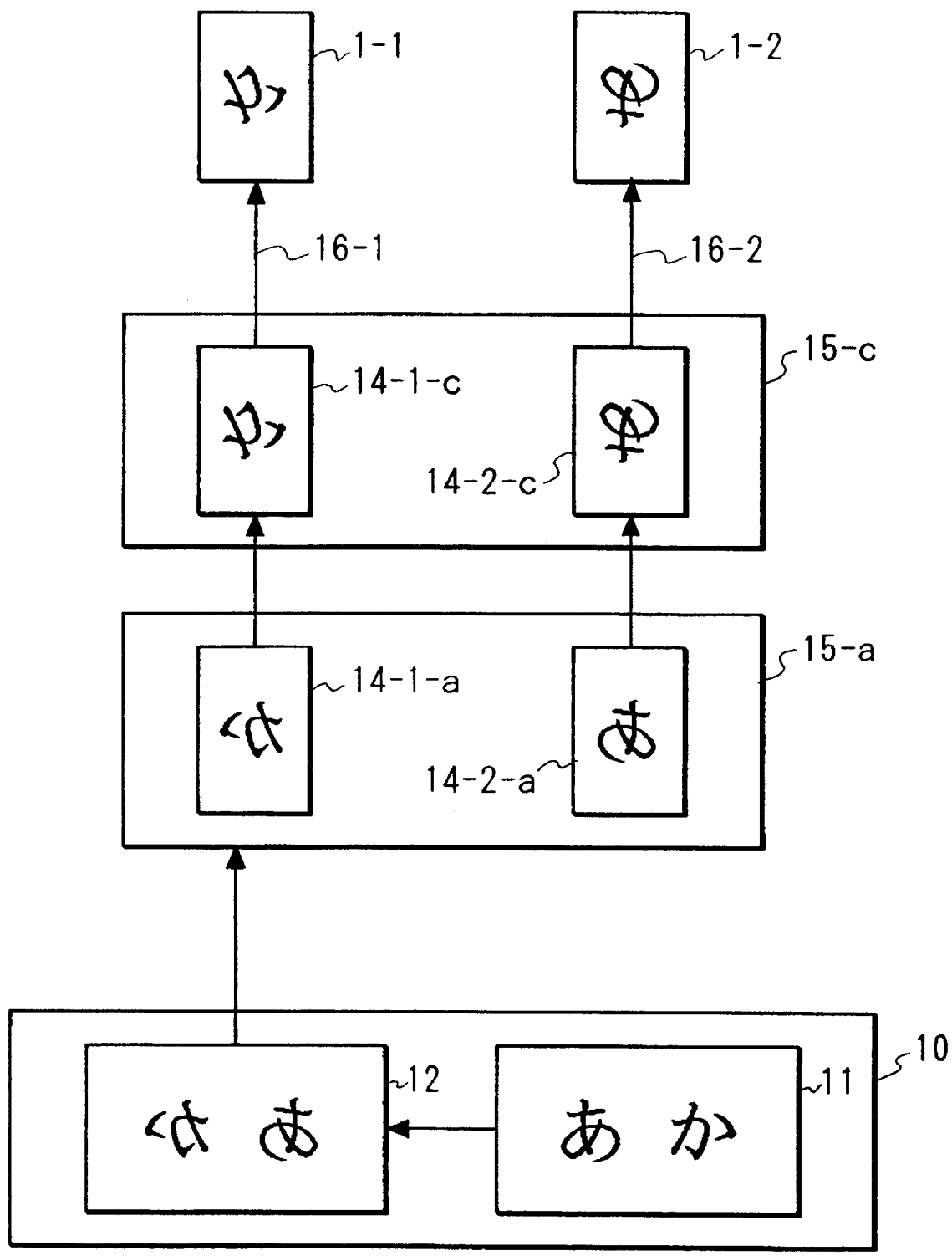
FIG. 16 is an explanatory view of an image display element shown in FIG. 15.

FIG. 16 is an explanatory view showing processing steps of dividing single large image into two pieces of image information, and divisionally displaying the two pieces of image information. A computer 10 generates an image 11, and the image 11 is converted into a mirror image 12. The mirror image 12 is supplied to a dividing circuit 15-$a$. The dividing circuit 15-$a$ divides the mirror image 12 into two partial images 14-1-$a$ and 14-2-$a$, and supplies these partial images to an inverting circuit 15-$c$. The inverting circuit 15-$c$ inverts the partial images 14-1-$a$ and 14-2-$a$ into inverted partial images 14-1-$c$ and 14-2-$c$, and supplies these inverted partial images to the LCDs 1-1 and 1-2.

In this embodiment, as described above, since $m_{1-a} \times m_{1-b} = m_{2-a} \times m_{2-b}$ is satisfied, the observer recognizes image information displayed on the LCDs 1-1 and 1-2 as a virtual image enlarged at an equal magnification on the virtual image plane 21.

Also, $m_{1-a} \times m_{1-b}$ and $m_{2-a} \times m_{2-b}$ may be set to have different values. In this case, an image on either LCD can be displayed in an enlarged scale as in the fourth embodiment of the present invention.

Figure 17:
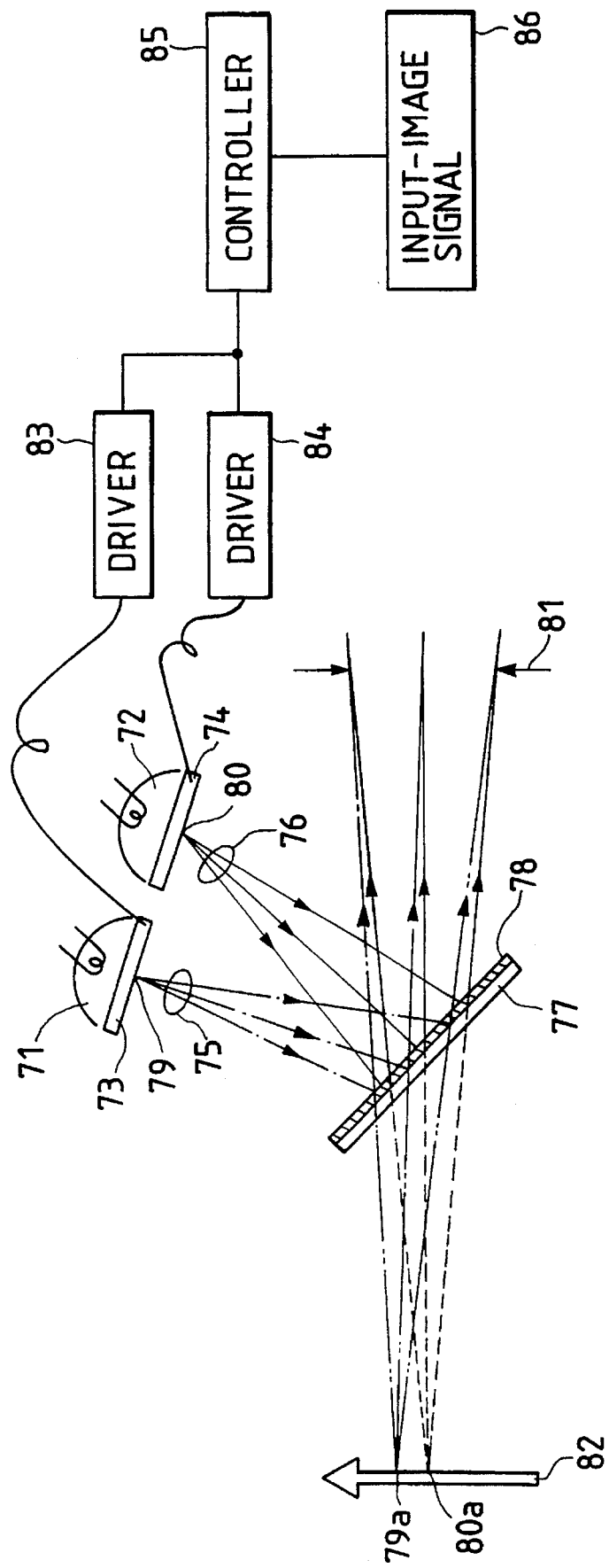
FIG. 17 is a schematic partial plan view showing the sixth embodiment of the present invention.

FIG. 17 is a schematic view showing the main part of the sixth embodiment of the present invention. In FIG. 17, rays indicated by solid lines and alternate long and short dashed lines represent light beams from the central portion of an image display element, and rays indicated by broken lines and alternate long and two short dashed lines represent imaginary rays.

Light beams emitted from backlight light sources 71 and 72 comprising, e.g., halogen lamps, fluorescent lamps, or the like are modulated by image display elements 73 and 74 such as LCD elements to be converted into image display light beams 75 and 76. The light beams 75 and 76 are incident on a holographic optical element (to be abbreviated as an "HOE" hereinafter) 78 formed on a glass or plastic substrate 77. The HOE 78 has double-exposed two-lens effects, converts the light beams 75 and 76 respectively emitted from points 79 and 80 into wavefronts as if they diverge from points 79$a$ and 80$a$, and radiates the converted wavefronts onto a pupil 81 of an observer.

The HOE 78 similarly wavefront-converts light beams from other points on the image display elements. Thus, an observer recognizes image information on the image display elements 73 and 74 as a virtual image 82.

FIG. 17 illustrates only light beams from the central points 79 and 80 on the image display elements 73 and 74.

Figure 18:
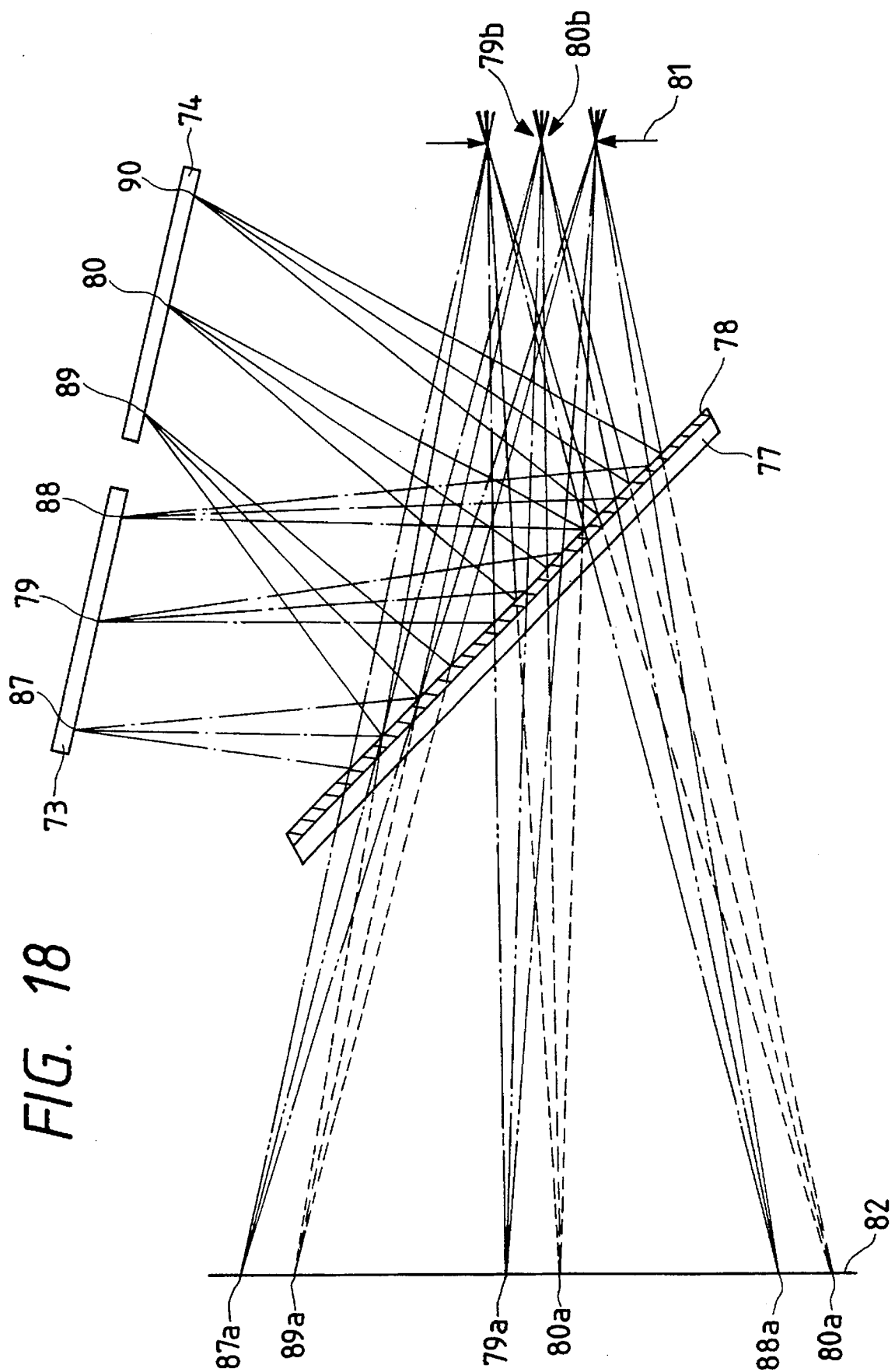
FIG. 18 is a partial explanatory view of an optical path shown in FIG. 17.

FIG. 18 is a schematic optical path chart of light beams having field angles. Referring to FIG. 18, points 87, 79, and 88, and points 89, 80, and 90 on the image display elements 73 and 74 correspond to points 87$a$, 79$a$, and 88$a$, and points 89$a$, 80$a$, and 90$a$ on a virtual image plane 82.

Image information to be displayed in this embodiment will be described below with reference to FIG. 19.

Assume that an input image signal 86 is an arrow inclined through 45°. The input image signal 86 is input to drivers 83 and 84 under the control of a controller 85, and identical arrow images displayed (in FIG. 19, pixels are expressed by ○ and □ marks for the sake of simplicity).

Since the identical arrow images are formed at points slightly shared by the HOE 78, arrows of ○ and □ marks are displayed to overlap each other in a synthesized image synthesized on the virtual image plane 82 in FIG. 17, as indicated by 82 in FIG. 19.

In this embodiment, the central points 79 and 80 on the image display elements 73 and 74 are displayed as the points 79$a$ and 80$a$ to be two-dimensionally shifted by half a pixel pitch on the virtual image plane 82. Thus, high-definition image information is displayed by interpolating information between two adjacent pixels.

As a method of manufacturing the HOE 78 used in this embodiment, a known technique can be utilized. In this embodiment, a volume phase hologram recorded on a photopolymer by a 2-beam interference method using an argon-ion laser is used.

Figure 20:
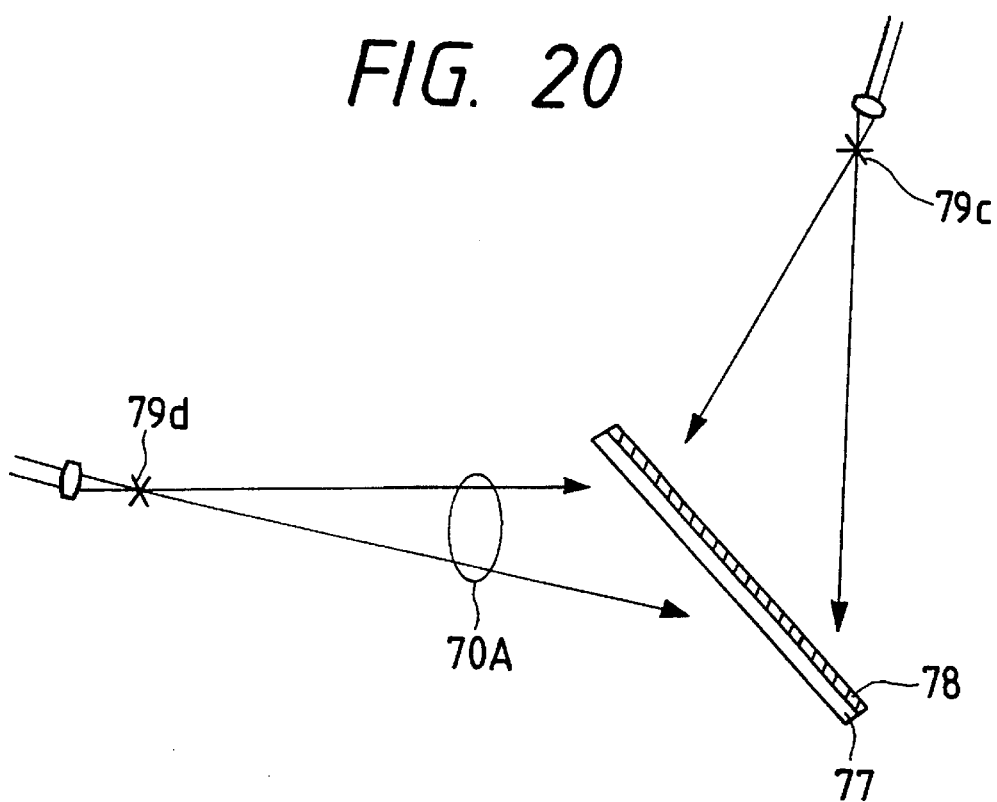
FIG. 20 is an explanatory view of a method of manufacturing a hologram optical element shown in FIG. 17.
Figure 21:
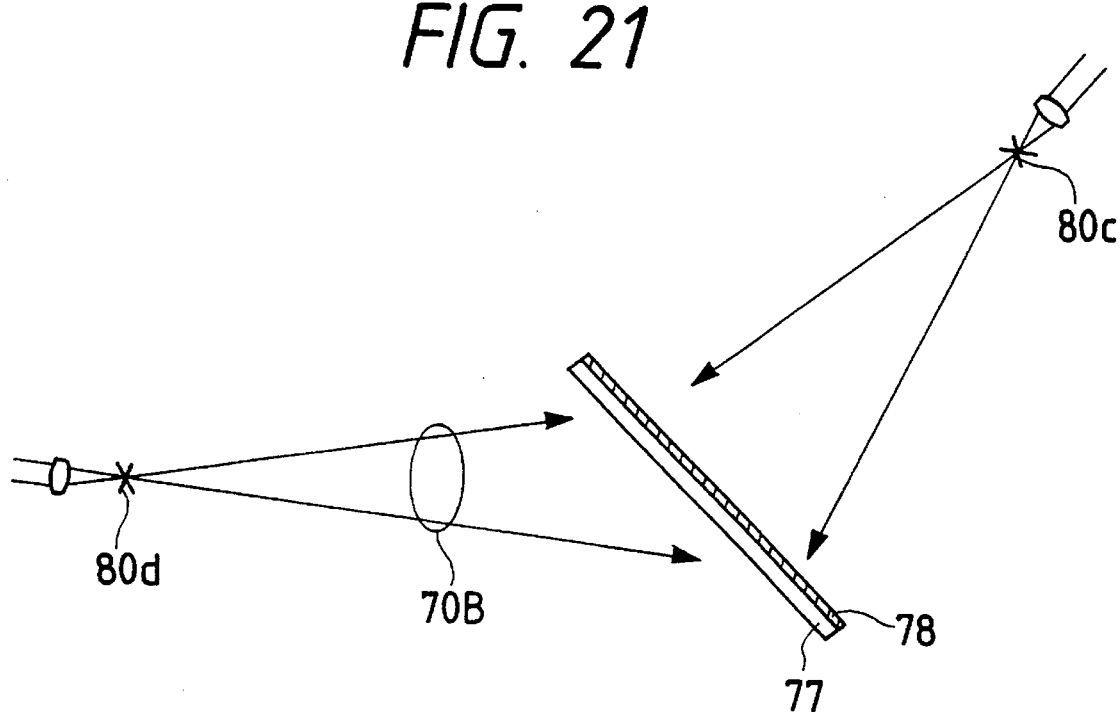
FIG. 21 is an explanatory view of the method of manufacturing the hologram optical element shown in FIG. 17.

More specifically, as shown in FIGS. 20 and 21, a monochrome laser beam having a wavelength of 514.5 nm emitted from an argon-ion laser is split into two beams. The two beams are guided to become incident on the front and rear surfaces of a hologram photosensitive material 78, so that one beam is defined as a divergent beam from a point 79$c$ corresponding to the point 79 in FIG. 17, and the other beam is defined as a divergent beam from a point 79$d$ corresponding to the point 79$a$, or one beam is defined as a divergent beam from a point 80$c$ corresponding to the point 80, and the other beam is defined as a divergent beam from a point 80$d$ corresponding to the point 80$a$.

First, the photosensitive material is exposed with the laser beam in an arrangement shown in FIG. 20, and is then exposed with the laser beam in an arrangement shown in FIG. 21. Thereafter, the hologram optical element HOE shown in FIG. 17 can be obtained by developing the hologram photosensitive material. In this case, the refractive index of the hologram photosensitive material almost coincides with that of the glass substrate 77. In this arrangement, a so-called Lippmann hologram is recorded.

In this hologram recording arrangement, the points 79d and 80d are shifted by half a pixel, and a light beam 70A is substantially the same as a light beam 70B, except that they have slightly different incident angles onto the hologram photosensitive material.

Therefore, as a hologram recording system, the light beam 70A, i.e., a divergent light beam from the point 79d may be used in place of the light beam 70B in FIG. 21.

Figure 22:
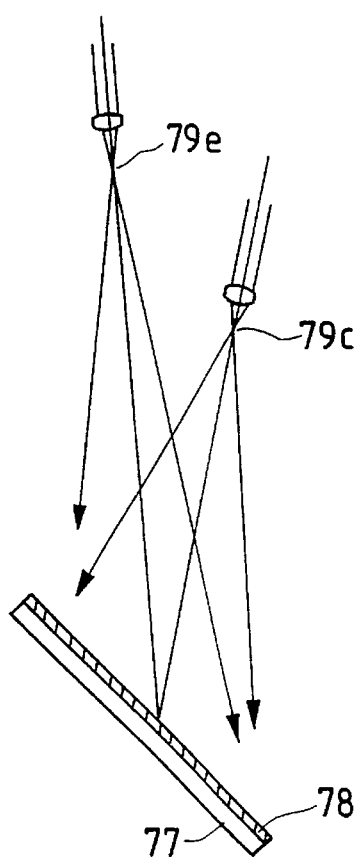
FIG. 22 is an explanatory view of the method of manufacturing the hologram optical element shown in FIG. 17.
Figure 23:
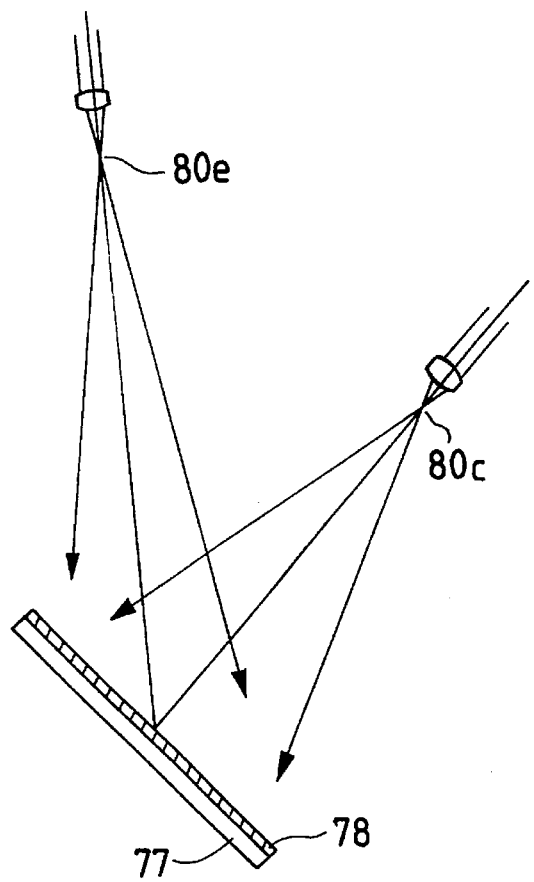
FIG. 23 is an explanatory view of the method of manufacturing the hologram optical element shown in FIG. 17.

FIGS. 22 and 23 are explanatory views showing another hologram recording optical system. Although the points 79c and 80c are the same as those in FIGS. 20 and 21, a point 79e is symmetrical with the point 79d with respect to a hologram surface, and a point 80e is symmetrical with the point 80d with respect to the hologram surface.

Figure 24:
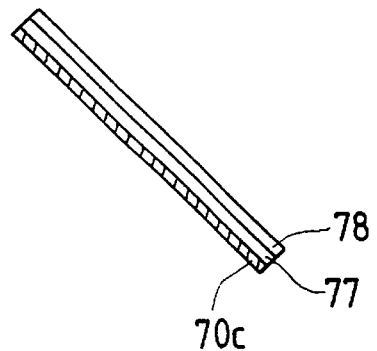
FIG. 24 is an explanatory view of the hologram optical element shown in FIG. 17.

Interference fringes from divergent light beams from the two points 79c and 79e in FIG. 22 are recorded, and then, interference fringes from divergent light beams from the two points 80c and 80e in FIG. 23 are recorded. The hologram photosensitive material is developed, and thereafter, a half mirror film 70c is coated on the glass substrate 77, as shown in FIG. 24. When the hologram (FIG. 24) prepared in this manner is set at a position of the HOE 78 (FIG. 17), a hologram optical element having the same effect can be obtained. Of course, a light beam from the point 79e can be used in place of a light beam from the point 80e in FIG. 23.

This HOE 78 is suitable for mass-production since the interference fringes to be recorded have a low spatial frequency unlike the above-mentioned Lippmann hologram. Furthermore, interference fringes are recorded using a photoresist as a photosensitive material, and the photoresist is developed to obtain a relief type hologram. A replica is formed using the obtained relief type hologram as a master hologram, and a structure obtained by coating a half mirror film on the relief structure of the replica hologram can be used at the position of the HOE 78 in FIG. 17. In this manner, a hologram combiner can be manufactured with lower cost. In the above-mentioned examples of the manufacturing method, multiple exposure is performed. Alternatively, exposure operations shown in FIGS. 20 and 21 may be performed at different positions on a single photosensitive member to manufacture a hologram. In this case, image display light beams need only be incident at different positions on a hologram.

Figure 25:
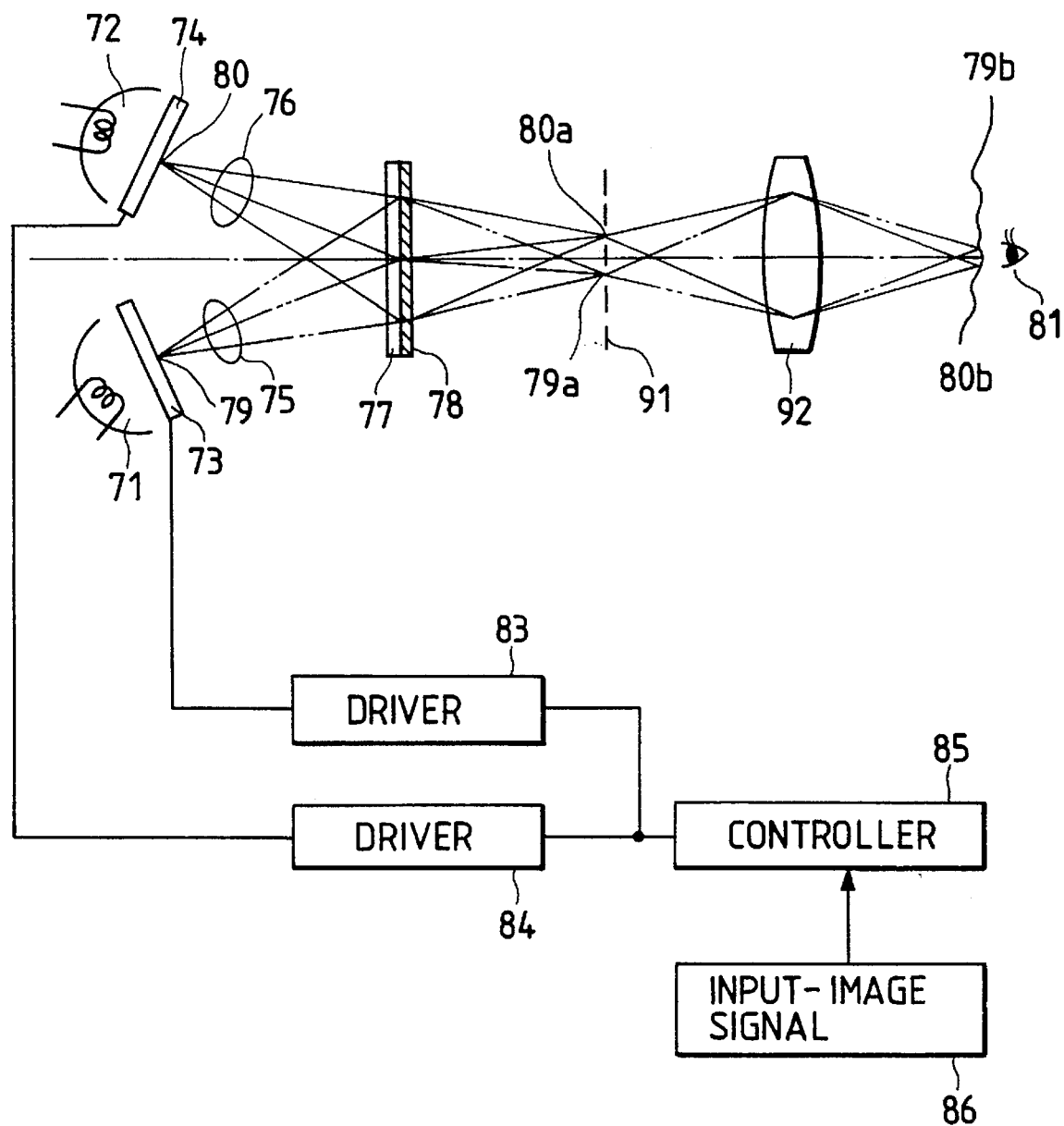
FIG. 25 is a schematic view showing the main part of the seventh embodiment of the present invention.

FIG. 25 is a schematic view showing the main part of the seventh embodiment of the present invention. This embodiment is substantially the same as the sixth embodiment, except that a transmission type HOE is used, intermediate images are formed, and an eyepiece is used.

Referring to FIG. 25, light beams 75 and 76 emerging from points 79 and 80 on image display elements 73 and 74 are imaged by a transmission type HOE 78 as points 79a and 80a on an intermediate imaging plane 91, and two images are synthesized, so that their pixels interpolate each other, as has been described above with reference to FIG. 19.

In the sixth embodiment, a synthesized image synthesized by the HOE is a virtual image, while in this embodiment, a spatial image of a real image is synthesized on the intermediate imaging plane 91. The synthesized spatial image is incident on a pupil 81 of an observer using an eyepiece lens 92, and the observer can recognize a high-definition synthesized image.

In this embodiment, a screen may be arranged at the position of the intermediate imaging plane 91, images are synthesized on the screen, and the synthesized image may be observed using the eyepiece lens 92. In this case, since an observer can recognize light of the synthesized image scattered by the screen, the NA of the eyepiece lens 92 can be decreased, thus achieving a compact apparatus.

Figure 26:
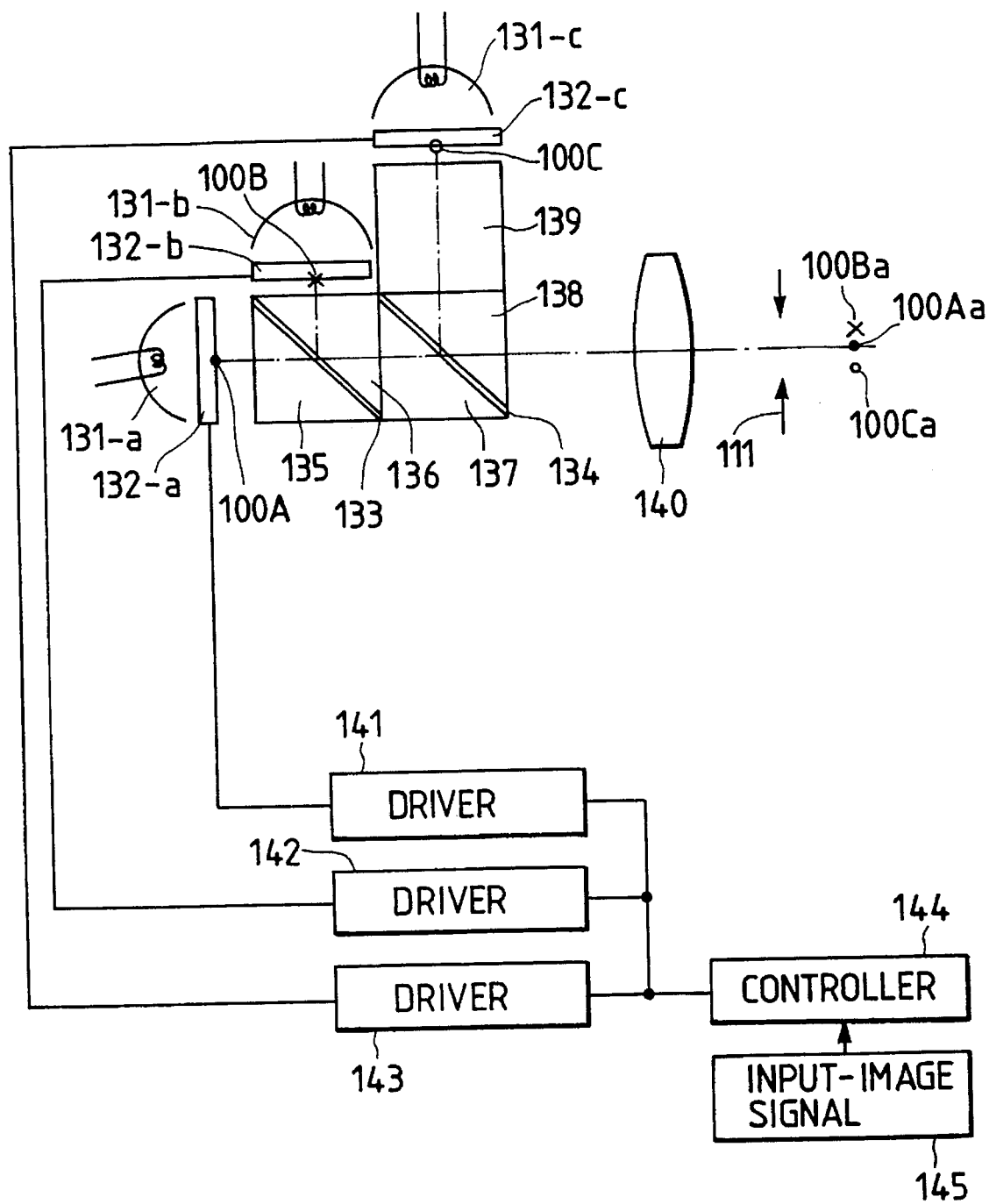
FIG. 26 is a schematic view showing the main part of the eighth embodiment of the present invention.

FIG. 26 is a schematic view showing the main part of the eighth embodiment of the present invention. In this embodiment, three image display elements are arranged, and three pieces of image information are synthesized to display high-definition image information.

In this embodiment, image information is synthesized by two HOEs, i.e., a reflection type HOE 133 adhered between prisms 135 and 136, and a reflection type HOE 134 adhered between the prisms 137 and 138.

In this embodiment, the most simple HOE element can be an element, which is recorded to diffract an incident plane wave at an angle slightly different from the incident angle, and has no lens function.

More specifically, the HOEs 133 and 134 are set so that a point 100A is projected on a point 100Aa via the two HOEs 133 and 134, a point 100B is projected by the reflection type HOE 133 onto a point 100Ba diffracted at an angle slightly shifted from a positive reflection angle, and a point 100C is projected onto a point 100Ca by the HOE 134.

At this time, the points 100Aa, 100Ba, and 100Ca are set at positions to interpolate information between corresponding pixels. As a result, an observer can recognize high-definition synthesized image information in which information between pixels is interpolated by the three images.

In order to obtain uniform brightness of each image information to be synthesized, a means for adjusting the brightness levels of backlight light sources 131-a, 131-b, and 131-c in consideration of the diffraction efficiency of the HOEs 133 and 134 may be arranged.

Alternatively, when the backlight light sources are set to have an equal brightness level, the diffraction efficiency of the HOE 133 is set to be 50%, and the diffraction efficiency of the HOE 134 is set to be 33.33%, three pieces of image information can have substantially equal luminance levels.

FIGS. 27A and 27B are schematic views showing the main part of the ninth embodiment of the present invention. In this embodiment, the present invention is applied to an output apparatus for a wordprocessor.

FIG. 27A is a perspective view of the overall apparatus, and FIG. 27B is a side view of the apparatus. The arrangement and function of this embodiment are basically the same as those of the sixth embodiment.

In this embodiment, an apparatus portion including control circuits such as the controller 85, the drivers 83 and 84, and the like in the sixth embodiment is stored together in a main body portion 141. An output signal from a wordprocessor 142 is input to the apparatus main body 141 via a signal line 143. A pivotal/expandable arm 144 is attached to the side surface of the apparatus main body 141, and can be adjusted in accordance with the body dimensions or desired position of an observer. Driver signals to image display elements 103 and 104, power cables for backlight light sources 101 and 102, and the like are arranged in this arm 144.

In this embodiment, the lens effect of an HOE 108 is set, so that a virtual image 112 synthesized by the HOE is formed near a keyboard as an observation point of the observer.

As a result, the observer can simultaneously observe an input result, a displayed figure, and the like while watching keys on the keyboard without turning away his or her eyes from the keyboard. In addition, since the observation point, the virtual image, and the keyboard coincide with each other, a fatigue caused by focus adjustment of pupils can be reduced.

In this embodiment, the present invention is applied to the wordprocessor. The present invention can also be applied to an output apparatus for a CAD system, which requires a high-definition image display. In this case, the HOE can be set, so that a synthesized virtual image 112 is formed on an input device such as a digitizer.

Figure 28A:
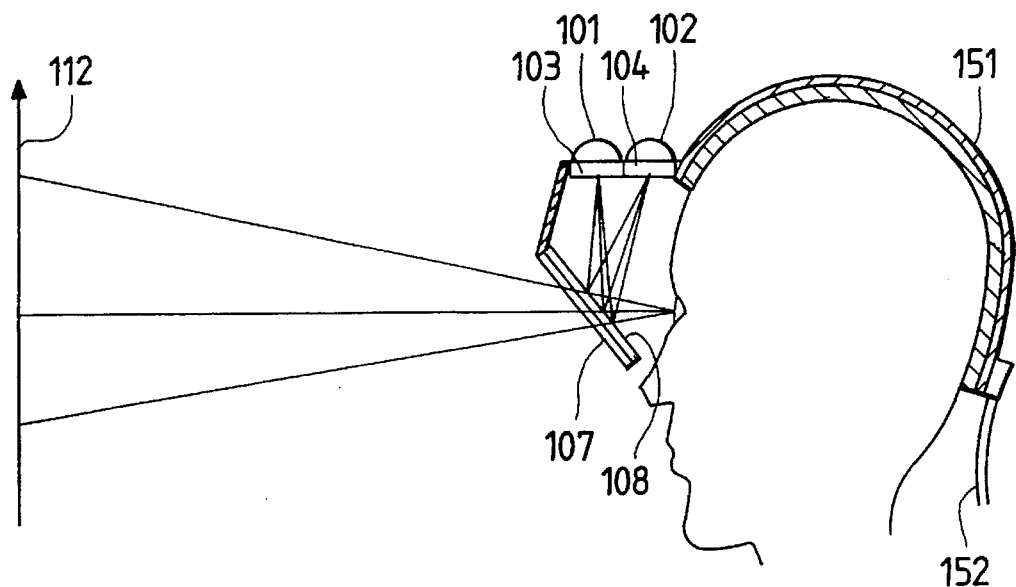
FIGS. 28A and 28B are respectively a schematic sectional view and a schematic plan view of the tenth embodiment of the present invention.
Figure 28B:
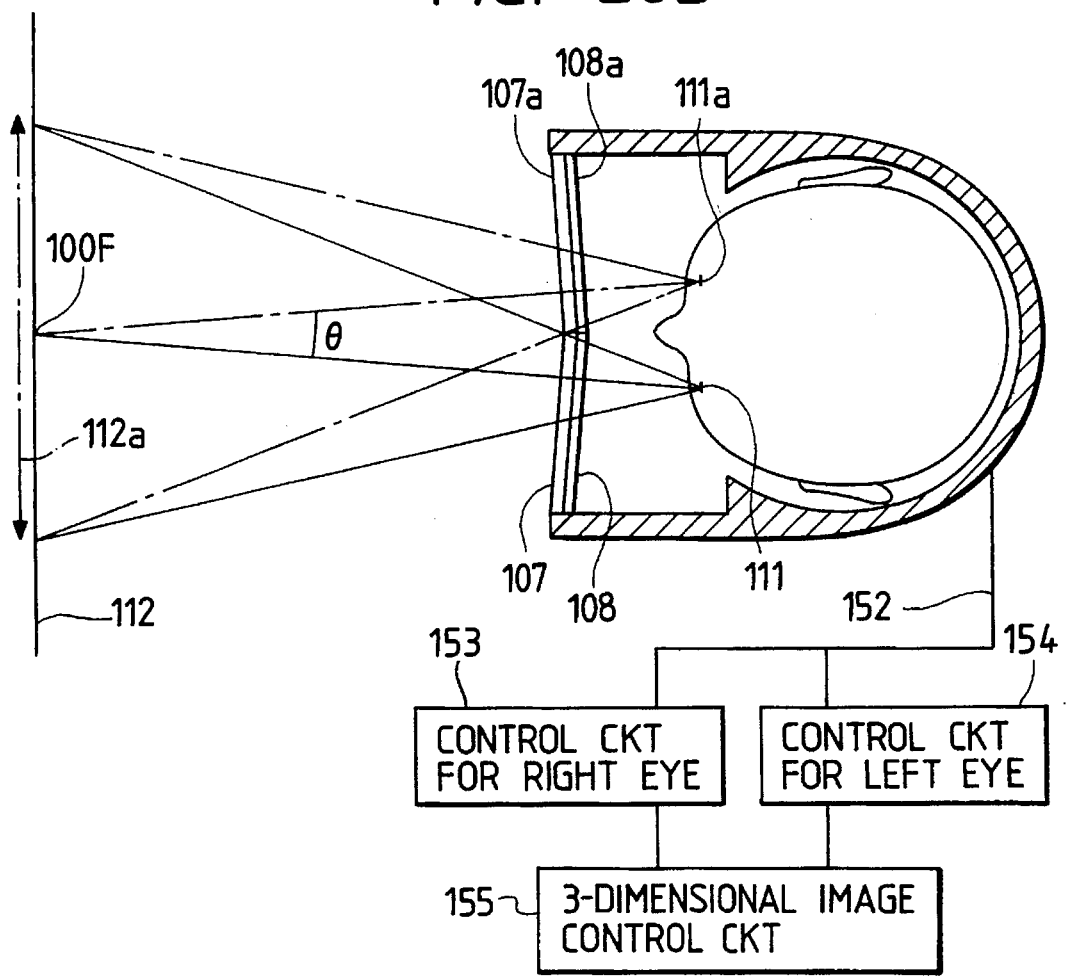

FIGS. 28A and 28B are schematic views showing the main part of the 10th embodiment of the present invention. In this embodiment, the present invention is applied to a so-called holographic display.

A 3-dimensional image can be observed by providing two pieces of image information having a parallax therebetween to two systems for the right and left eyes. An optical arrangement and its function for each eye are the same as those in the sixth embodiment, and a detailed description thereof will be omitted.

In this embodiment, a vergence angle θ is provided between the optical axes of the optical systems for the right and left eyes, so that corresponding origins of two images cross at a point 100F at a virtual image position 112. A conventional head-mount display (to be referred to as an HMD hereinafter) causes fatigues of the eyes and physiological discomfort owing to parallel visual axis directions although a generated virtual image position is not an infinity position. However, this embodiment can solve such problems.

in this embodiment, image signals of images for the right and left eyes, which images are formed by a 3-dimensional image control circuit 155, and have a parallax therebetween, are added with control signals such as proper synchronization signals, and the like, and are respectively input to image control circuits 153 and 154 for the right and left eyes. A plurality of image display elements for each eye (not shown in FIG. 28B; elements 103 and 104 for the left eye in FIG. 28A) are driven to display a predetermined image.

Predetermined images on the plurality of image display elements are synthesized by HOEs 107 and 107a on the virtual image plane 112, so that pixels of these images interpolate each other, thus presenting high-definition images to corresponding pupils (eyes) 111 and 11a of the observer. In this manner, the observer can recognize a high-definition image having a binocular parallax as a 3-dimensional view factor.

In this embodiment, the system displays images to have a vergence angle θ therebetween. However, an apparatus for displaying a high-definition image as the characteristic feature of the present invention is not limited to this system. For example, even when the two optical systems are arranged parallel to each other like in the conventional HMD, the same effect as in this embodiment can be provided.

In this embodiment, the signal cable 152 is used. Alternatively, power sources for the backlight light sources of the image display elements may be used as batteries, and signals may be transmitted using infrared rays in a wireless manner.

According to the present invention, as described above, when a plurality of image display elements, and respective elements such as a hologram optical element, and the like are properly arranged, an image display apparatus, which can display high-definition image information on a large screen, can be provided.

In addition, according to the present invention, when a plurality of image display elements each consisting of a large number of pixels, and respective elements such as a hologram optical element, and the like are properly arranged, an image display apparatus, which can effectively synthesize image information based on the plurality of image display elements, and can display high-definition image information on a large screen, can be provided.

What is claimed is:

1. An image display apparatus comprising:

a plurality of image display elements; and a hologram optical element provided with a plurality of elementary hologram optical elements having an optical power corresponding to said plurality of image display elements, wherein each of said elementary hologram optical elements diffracts light from a corresponding one of said image display elements, said plurality of diffracted light traveling to a single pupil of an observer positioned at a predetermined position with respect to said hologram optical element, so that a virtual image by each said image display element is formed on the same virtual image plane to allow the observer to observe the virtual image as a single continuous virtual image.

2. An apparatus according to claim 1, wherein each of said elementary hologram optical elements is a volume phase type hologram.

3. An apparatus according to claim 1, wherein an incident angle formed when a light beam from one of said image display elements not corresponding to a certain elementary hologram optical element is incident on said certain elementary hologram optical element is different from a predetermined incident angle determined by angular selectivity characteristics of said one elementary hologram optical element.

4. An apparatus according to claim 1, wherein a spatial arrangement of said plurality of image display elements is different from a spatial arrangement of said plurality of elementary hologram optical elements corresponding to said image display elements.

5. An image display apparatus comprising:

a plurality of image display elements respectively assigned to different partial image information regions of an image to be displayed; and a hologram optical element provided with a plurality of elementary hologram optical elements having an optical power corresponding to said plurality of image display elements, wherein each of said elementary hologram optical elements diffracts light from a corresponding one of said image display elements, said plurality of diffracted light traveling to a single pupil of an observer positioned at a predetermined position with respect to said hologram optical element, so that a virtual image by each said image display element is formed on the same virtual image plane to allow the observer to observe the virtual image as a single continuous virtual image.

6. An apparatus according to claim 5, wherein a pixel density of said image display element assigned to a central image information region of the image to be displayed is different from pixel densities of said image display elements assigned to other partial image information regions.

7. An apparatus according to claim 5 a distance between said hologram optical element and said image display element assigned to a central image information region of the image to be displayed is different from distances between said hologram optical element and said image display elements assigned to other partial image information regions.

8. An image display apparatus comprising:

a plurality of image display elements, each of said image display elements having a plurality of pixels; and a hologram optical element provided with a plurality of elementary hologram optical elements having an optical power corresponding to said plurality of image display elements, wherein each of said elementary hologram optical elements diffracts light from a corresponding one of said image display elements, said plurality of diffracted light traveling to a single pupil of an observer positioned at a predetermined position with respect to said hologram optical element, so that a virtual image by each said image display element is formed on the same virtual image plane to allow the observer to observe the virtual image as a single continuous virtual image, and wherein said hologram optical element diffracts the plurality of image light beams so as to display a synthesized image by interpolating information between pixels of a plurality of images to be synthesized.

9. An apparatus according to claim 8, wherein the synthesized image is displayed on a predetermined plane via said hologram optical element as a virtual image.

10. An apparatus according to claim 8, wherein said hologram optical element is formed by multiple exposure.

11. An apparatus according to claim 8, wherein said elementary hologram optical elements correspond in number to said plurality of image display elements.

12. An apparatus according to claim 8, wherein said hologram optical element has selectivity of wave length for reflexively-diffracting only a light beam having a specific wavelength component of light beams from said image display elements, and transmitting light beams having other wavelength components.

13. An image display apparatus according to claim 8, wherein the synthesized image is displayed on a predetermined plane via said hologram optical element as a real image.

14. A 3-dimensional image display apparatus, which allows recognition of a 3-dimensional image by presenting two pieces of image information having a parallax therebetween to two systems for right and left eyes, comprising:

first image display means for the right eye;

second image display means for the left eye;

each of said first and second image display means having a plurality of image display elements, and said plurality of image display elements being assigned to different partial image information regions of an image to be displayed, first deflection means for the right eye; and second deflection means for the left eye, each of said first and second deflection means having a plurality of elementary hologram optical elements having an optical power corresponding to said plurality of image display elements, wherein each of said elementary hologram optical elements diffracts light from a corresponding one of said image display elements, said plurality of diffracted light traveling to a single pupil of an observer positioned at a predetermined position with respect to said first and second deflection means, so that a virtual image by each said image display element is formed on the same virtual image plane to allow the observer to observe the virtual image as a single continuous virtual image.

15. A 3-dimensional image display apparatus, which allows recognition of a 3-dimensional image by presenting two pieces of image information having a parallax therebetween to two systems for right and left eyes, comprising:

first image display means for the right eye;

second image display means for the left eye;

each of said first and second image display means having a plurality of image display elements, and each of said plurality of image display elements having a plurality of pixels, first deflection means for the right eye; and second deflection means for the left eye, each of said first and second deflection means having a plurality of elementary hologram optical elements having an optical power corresponding to said plurality of image display elements, wherein each of said elementary hologram optical elements diffracts light from a corresponding one of said image display elements, said plurality of diffracted light traveling to a single pupil of an observer disposed at a predetermined position with respect to said first and second deflection means, so that a virtual image by each said each image display element is formed on the same virtual image plane to allow the observer to observe the virtual image as a single continuous virtual image.

* * * * *

UNITED STATES PATENT AND TRADEMARK OFFICE
CERTIFICATE OF CORRECTION

PATENT NO.   :   5,589,956
DATED        :   December 31, 1996
INVENTOR(S)  :   Morishima et al.

It is certified that error appears in the above-indentified patent and that said Letters Patent is hereby corrected as shown below:   On the title page: Item

[56]  REFERENCES CITED:

FOREIGN PATENT DOCUMENTS, "434512   2/1992   Japan" should read --4-34512   2/1992   Japan--.

COLUMN 17:

Line 33, "in" should read --In--.

COLUMN 18:

Line 64, "claim 5" should read --claim 5, wherein--.

COLUMN 20:

Line 44, "said each" should read --said--.

Signed and Sealed this

Nineteenth Day of August, 1997

Attest:

Attesting Officer

BRUCE LEHMAN

Commissioner of Patents and Trademarks